(12) United States Patent
Sueki et al.

(10) Patent No.: US 10,831,436 B2
(45) Date of Patent: Nov. 10, 2020

(54) OBJECT DISPLAY SYSTEM, USER COMMUNICATION DEVICE, AND OBJECT DISPLAY METHOD AND PROGRAM

(71) Applicant: CASIO COMPUTER CO., LTD., Tokyo (JP)

(72) Inventors: Tsukasa Sueki, Kunitachi (JP); Koji Yamamoto, Fussa (JP); Shosaku Suzuki, Machida (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/329,140

(22) PCT Filed: Aug. 28, 2017

(86) PCT No.: PCT/JP2017/031684
§ 371 (c)(1),
(2) Date: Feb. 27, 2019

(87) PCT Pub. No.: WO2018/043732
PCT Pub. Date: Mar. 8, 2018

(65) Prior Publication Data
US 2019/0205078 A1 Jul. 4, 2019

(30) Foreign Application Priority Data
Aug. 31, 2016 (JP) .................. 2016-169672

(51) Int. Cl.
*G06F 3/147* (2006.01)
*A63F 13/52* (2014.01)
(Continued)

(52) U.S. Cl.
CPC ............ *G06F 3/147* (2013.01); *A63F 13/213* (2014.09); *A63F 13/235* (2014.09);
(Continued)

(58) Field of Classification Search
CPC .................. G06F 3/147; G06F 3/1454; G06K 2009/3225; G06K 9/3216; G06K 9/00671;
(Continued)

(56) References Cited

U.S. PATENT DOCUMENTS 10,129,299 B1 * 11/2018 McClintock ........ H04L 63/0869
2003/0062675 A1    4/2003 Noro et al.
(Continued)

FOREIGN PATENT DOCUMENTS

JP    2000350860 A    12/2000
JP    2003103045 A    4/2003
(Continued)

OTHER PUBLICATIONS

International Search Report (ISR) dated Oct. 31, 2017 issued in International Application No. PCT/JP2017/031684.
(Continued)

*Primary Examiner* — Ke Xiao
*Assistant Examiner* — Kim Thanh T Tran
(74) *Attorney, Agent, or Firm* — Holtz, Holtz & Volek PC

(57) ABSTRACT

A beacon device is a mobile object having an AR marker provided on its surface which indicates an existing position of the beacon device in actual space and transmits a beacon signal including a beacon ID. A user communication device, which is a mobile object equipped with an imaging function, identifies the position of the beacon device by recognizing the AR marker in a live view image, receives the beacon signal transmitted from the beacon device, transmits the beacon ID to a server device and controls to display an object corresponding to the beacon ID transmitted from the server device at the identified position of the beacon device in the live view image. The server device reads out the object corresponding to the beacon ID transmitted from the user (Continued)

communication device from a character data file group and transmits that data to the user communication device.

23 Claims, 14 Drawing Sheets

(51) Int. Cl.

| | | |
|---|---|---|
| *A63F 13/35* | (2014.01) | |
| *A63F 13/235* | (2014.01) | |
| *G06K 9/32* | (2006.01) | |
| *G06F 3/14* | (2006.01) | |
| *A63F 13/213* | (2014.01) | |
| *G06K 9/00* | (2006.01) | |
| *A63F 13/56* | (2014.01) | |
| *A63F 13/332* | (2014.01) | |
| *A63F 13/92* | (2014.01) | |
| *A63F 13/323* | (2014.01) | |
| *A63F 13/58* | (2014.01) | |
| *A63F 13/65* | (2014.01) | |
| *G06T 19/00* | (2011.01) | |
| *G09G 5/24* | (2006.01) | |

(52) U.S. Cl.
CPC .......... *A63F 13/323* (2014.09); *A63F 13/332* (2014.09); *A63F 13/35* (2014.09); *A63F 13/52* (2014.09); *A63F 13/56* (2014.09); *A63F 13/58* (2014.09); *A63F 13/65* (2014.09); *A63F 13/92* (2014.09); *G06F 3/1454* (2013.01); *G06K 9/00664* (2013.01); *G06K 9/00671* (2013.01); *G06K 9/3216* (2013.01); *G06T 19/006* (2013.01); *A63F 2300/1031* (2013.01); *A63F 2300/50* (2013.01); *G06K 2009/3225* (2013.01); *G09G 5/24* (2013.01); *G09G 2340/02* (2013.01); *G09G 2370/022* (2013.01); *G09G 2370/042* (2013.01); *G09G 2370/16* (2013.01)

(58) Field of Classification Search
CPC .............. G06K 9/00664; G06T 19/006; G09G 2370/042; G09G 2370/022; G09G 2370/16; G09G 2340/02; G09G 5/24; A63F 2300/1031; A63F 2300/50; A63F 13/213; A63F 13/56; A63F 13/332; A63F 13/92; A63F 13/323; A63F 13/58; A63F 13/65; A63F 13/52; A63F 13/35; A63F 13/235
USPC ........................................................ 345/629
See application file for complete search history.

(56) References Cited

U.S. PATENT DOCUMENTS

| | | |
|---|---|---|
| 2005/0168486 A1 | 8/2005 | Sato et al. |
| 2008/0024523 A1 | 1/2008 | Tomite et al. |
| 2012/0194549 A1* | 8/2012 | Osterhout .......... G02B 27/0093 345/633 |
| 2013/0050261 A1* | 2/2013 | Rekimoto ............... G06F 3/002 345/633 |
| 2013/0069985 A1* | 3/2013 | Wong ................... G02B 27/017 345/633 |
| 2013/0235078 A1* | 9/2013 | Takahashi ............... G06T 11/00 345/633 |
| 2016/0104323 A1 | 4/2016 | Tanaka et al. |
| 2016/0119614 A1* | 4/2016 | Masuda ............... H04N 9/3182 345/207 |

FOREIGN PATENT DOCUMENTS

| | | |
|---|---|---|
| JP | 2008033531 A | 2/2008 |
| JP | 2009289035 A | 12/2009 |
| JP | 2011243019 A | 12/2011 |
| JP | 2014071838 A | 4/2014 |
| JP | 2016081110 A | 5/2016 |

OTHER PUBLICATIONS

Written Opinion dated Oct. 31, 2017 issued in International Application No. PCT/JP2017/031684.
Masayuki Kanbara, et al., "Jitsusekai no Kogen Kankyo o Koryo shita Kakucho Genjitsukan," Image Lab, Oct. 1, 2003, vol. 14, No. 10, pp. 43-47.

* cited by examiner

FIG. 6A

TB1 USER TABLE

| USER ID | USER NAME | OTHER USER INFORMATION | BEACON ID |
|---------|-----------|------------------------|-----------|
| ***     | ***       | ***                    | ***       |
| ***     | ***       | ***                    | ***       |
| ***     | ***       | ***                    | ***       |
| ⋮       | ⋮         | ⋮                      | ⋮         |

FIG. 6B

TB2 BEACON-SPECIFIC CHARACTER TABLE

| BEACON ID | AR MARKER | CHARACTER ID | CHARACTER NAME |
|-----------|-----------|--------------|----------------|
| ***       | ***       | ***          | ***            |
| ***       | ***       | ***          | ***            |
| ***       | ***       | ***          | ***            |
| ⋮         | ⋮         | ⋮            | ⋮              |

FIG. 7

TB3 CHARACTER MOTION CONTROL TABLE

| CHARACTER ID | CHARACTER MOTION CONTROL INFORMATION ||||||||
|---|---|---|---|---|---|---|---|---|
| | BASIC MOTION NAME | VARIATION (VARIATION NAME, REPLACEMENT CONDITION) ||| APPEARANCE CONDITION ||||
| | | CLOSENESS | TAP REACTION | USAGE ENVIRONMENT (SEASON, LOCATION) | TIME BAND | LOCATION | APPEARANCE RATE |
| *** | MEAL | CONTENTS OF MEAL ARE CHANGED | STOP EATING AND TALK ABOUT IMPRESSION | CLOTHING IS CHANGED | NIGHT MEAL TIME BAND | NO SPECIFI-CATION | ONCE A DAY |
| | BATH | WASHING PORTION IS CHANGED | HUMMING | NO SPECIFICATION | 20:00 TO 24:00 | HOME | ONCE A DAY |
| | READING | READING POSTURE IS CHANGED | STOP READING AND TALK ABOUT IMPRESSION | NO SPECIFICATION | NO SPECIFI-CATION | NO SPECIFI-CATION | THREE TIMES A DAY |
| | ... | ... | ... | ... | ... | ... | ... |
| *** | DANCE | DIFFICULTY IS CHANGED | STOP DANCING AND TALK ABOUT IMPRESSION | CLOTHING IS CHANGED | 8:00 TO 20:00 | OTHER THAN HOME | NORMAL |
| | ... | ... | ... | ... | ... | ... | ... |
| ... | ... | ... | ... | ... | ... | ... | ... |

TB4 USER-SPECIFIC CHARACTER USAGE STATUS TABLE

| USER ID | CHARACTER ID | BASIC MOTION-SPECIFIC CHARACTER USAGE STATUS | | NUMBER OF ACCESSES (PER DAY) | OTHER STATE INFORMATION |
|---|---|---|---|---|---|
| | | CLOSENESS OF USER AND CHARACTER | | | |
| | | ACCESS TIME CUMULATIVE TOTAL VALUE | ACCESS FREQUENCY | | |
| * * * | * * * | * * * | * * * | * * * | * * * |
| * * * | * * * | * * * | * * * | * * * | * * * |
| ⋮ | ⋮ | ⋮ | ⋮ | ⋮ | ⋮ |

WHEN USER AND BEACONS ARE IN 1-TO-N RELATION

WHEN USERS AND BEACON ARE IN N-TO-1 RELATION

WHEN USERS AND BEACONS ARE IN N-TO-N RELATION

OBJECT DISPLAY SYSTEM, USER COMMUNICATION DEVICE, AND OBJECT DISPLAY METHOD AND PROGRAM

CROSS REFERENCE TO RELATED APPLICATIONS

This application is a U.S. National Phase patent application of International Application No. PCT/JP2017/031684, filed Aug. 28, 2017, which is based on and claims priority from Japanese Patent Application No. 2016-169672, filed Aug. 31, 2016, the entire contents of both of which are incorporated herein by reference.

TECHNICAL FIELD

The present invention relates to an object display system that displays an object on a user communication device, a user communication device, an object display method, and a program.

BACKGROUND ART

Mobile terminal devices, such as smartphones, are becoming increasingly multifunctional, and generally have an image processing function referred to as Augmented Reality (AR), in addition to a camera function (imaging function). In this function, an object image is superimposed and displayed at a predetermined position in a captured live view image. Specifically, when a photographic subject is captured by the imaging function with an Augmented Reality marker (AR marker: a marker on which a white pattern is drawn within a black frame) composed of printed material being arranged at or near the position of the intended subject, the user communication device recognizes the AR marker included in the captured image by analyzing the captured image, and displays an object image on the area of the AR marker by image composition and AR display so as to acquire a sense of reality on the user terminal screen as if the object is existing in real space.

Conventionally, as a technique for a user communication device having the above-described image processing function (AR display function), a technique is known in which, when application software and various types of data related to games are downloaded from a server device and an area where a card provided with an AR marker is arranged is photographed by the imaging function, the AR marker in the captured image is recognized and the object (character) of the card is superimposed and displayed in the captured image (see Patent Document 1).

PRIOR ART DOCUMENT

Patent Document

Patent Document 1: JP 2014-71838

SUMMARY OF INVENTION

Means for Solving the Problem

According to one aspect of the present invention, there is provided an object display system which comprises a user communication device, a beacon device and a server device, and displays an object on the user communication device by communication with the user communication device, the beacon device and the server device, wherein the beacon device has image information provided on a surface thereof and comprises a transmission section which transmits a beacon signal including predetermined identification information, wherein the user communication device comprises:

an imaging section;

a display section which displays a live view image that is based on results of image capturing by the imaging section;

a first communication section; and a first processor which (i) recognizes the image information of the live view image captured by the imaging section and identifies a position of the beacon device in the live view image, (ii) controls the first communication section to receive the beacon signal transmitted from the beacon device and controls the first communication section to transmit the predetermined information included in the beacon signal to the server device, (iii) controls the first communication section to receive management information of the object corresponding to the identification information transmitted from the server device that received the predetermined identification information, and (iv) controls the display section to display the object based on the received management information of the object, at the identified position in the live view image, and wherein the server device comprises:

an object storage section which stores management information of various types of objects in association with predetermined identification information;

a second communication section; and a second processor which (i) controls the second communication section to receive the predetermined identification information transmitted from the user communication device by the first processor, (ii) acquires, from the object storage section, the management information of the object corresponding to the received predetermined identification information, and (iii) controls the second communication section to transmit the management information to the user communication device.

BRIEF DESCRIPTION OF DRAWINGS

FIG. 6A is a diagram describing a USER TABLE TB1, and FIG. 6B is a diagram describing a BEACON-SPECIFIC CHARACTER TABLE TB2.

FIG. 7 is a diagram describing a CHARACTER MOTION CONTROL TABLE TB3.

DESCRIPTION OF EMBODIMENTS

An embodiment of the present invention will hereinafter be described with reference to FIG. 1 to FIG. 13.

Figure 1:
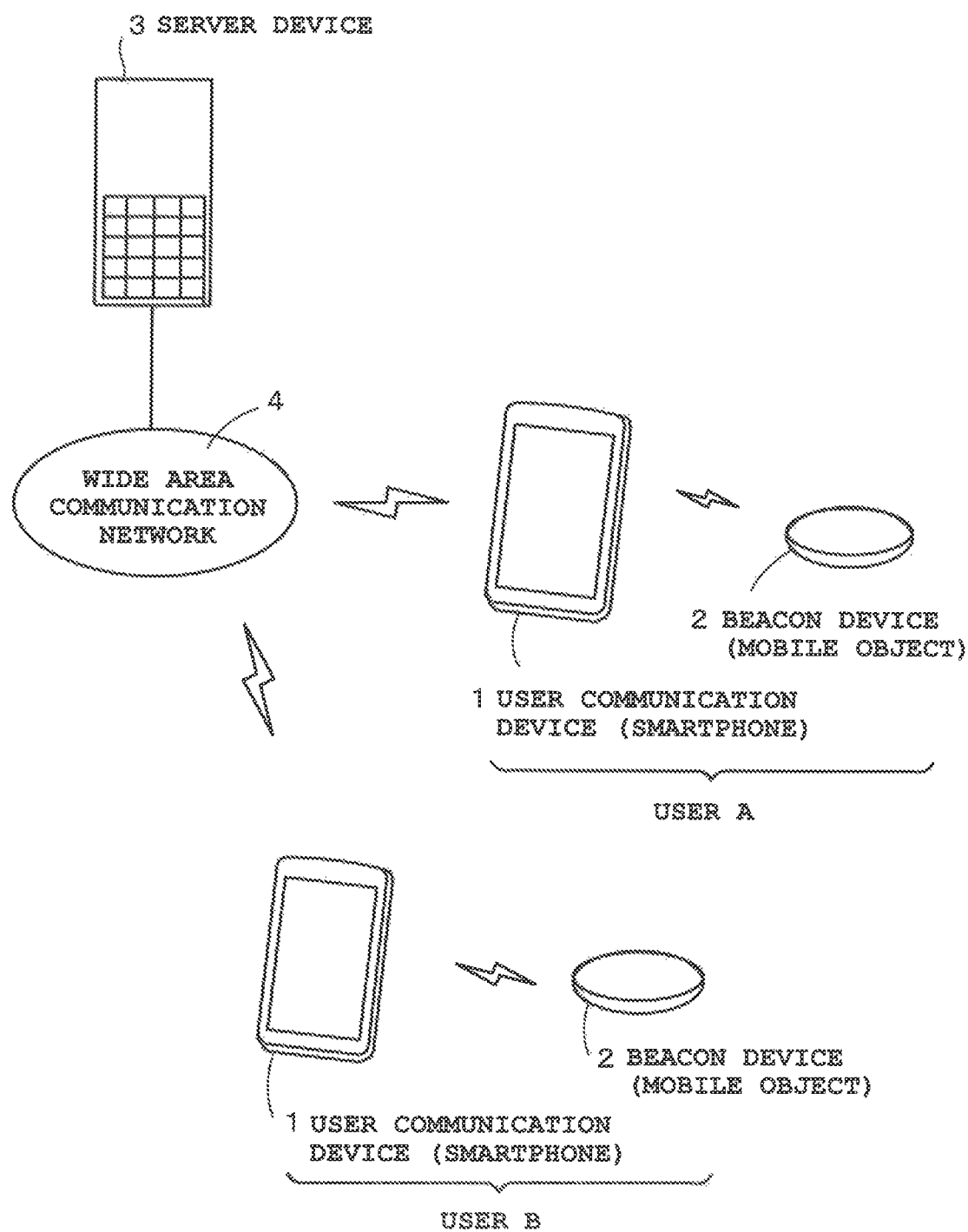
FIG. 1 is a block structural diagram outlining an object display system that includes a plurality of user communication devices 1, a plurality of beacon devices 2 and a server device 3, and displays a predetermined object (character) on a user communication device 1 by communication with the user communication device 1, the corresponding beacon device 2 and the server device 3.

FIG. 1 is a block structural diagram outlining an object display system which includes a plurality of user communication devices 1, a plurality of beacon devices 2 and a server device 3, and displays a predetermined object on a user communication device 1 by communication with the user communication device 1, the corresponding beacon device 2 and the server device 3.

Each user communication device 1 is a user side communication device that can be carried around as a mobile object having an imaging function and an Augmented Reality (AR) display function. In this embodiment, this user communication device 1 is a smartphone that is a multi-function portable telephone.

Each beacon device 2 is a thin circular button type communication device that can be carried around as a mobile object, and is sold as an accessory of the user communication device 1 or sold separately from the user communication device 1 as a single product. Each user purchases and possesses a desired beacon device 2 from among many types of beacon devices 2. The types of beacon devices herein indicate beacon devices whose patterns (picture) printed on the surfaces are different, and each pattern (picture) corresponds to the type of an object (character) described later. Each user can purchase a beacon device 2 corresponding to an object (character) of his/her favorite type by looking at its pattern (picture). Each beacon device 2 is configured to transmit a beacon signal including its beacon ID for beacon terminal identification as predetermined identification information and thereby provide the identification information (beacon ID) to the above-described user communication device 1.

More specifically, the beacon device 2 is capable of transmitting a wireless signal by a communication standard referred to as Bluetooth (registered trademark) once every few seconds, within a range (communication available area) of about a maximum radius of some 10 meters. In this embodiment, since the power is soon used up with the Bluetooth (registered trademark) communication standard, a communication standard called Bluetooth (registered trademark) Low Energy (BLE), which does not use much power, is used to carry out a bi-directional communication with the user communication device 1, within a limited communication available area (e.g., radius of five meters). Note that, although the beacon device 2 transmits a beacon signal at a predetermined transmission intensity (output intensity) in accordance with a communication available area, the output intensity (communication available area) may be arbitrarily adjusted by a user operation. For example, the communication available area (radius of 5 meters) set in advance may be changed to a radius of 2 meters. The beacon signal herein is a wireless signal provided to notify the other devices that the own terminal device exists within a predetermined distance range. Furthermore, the beacon device herein is a device that can carry out wireless communication for notifying the other devices that the own terminal device exists within a predetermined distance range.

At the time of first connection (e.g., first time the beacon device 2 is introduced: immediately after being purchased) of the user communication device 1 and the beacon device 2, pairing processing (pairing initial setting process) by mutual communication is performed to associate the user communication device 1 with the beacon device 2. The example of the drawing shows a case in which a user communication device 1 possessed by user A and the corresponding beacon device 2 are associated with each other in a one-to-one relationship, and a user communication device 1 possessed by user B and the corresponding beacon device 2 are associated with each other in a one-to-one relationship. As such, in the present embodiment, the case is described in which a user communication device 1 and a beacon device 2 are associated with each other in a one-to-one relationship for each user.

The server device 3 stores and manages basic information (information defining basic appearances and operations before being specialized for each user) of various types of objects (e.g., 50 types of objects) as data library, and stores and manages individual information (information regarding customization of basic appearance and operation indicated by basic information for each user, which includes state information that affects basic appearance, operation, etc.) of each object (by which objects of the same type can have different appearances and operations).

The server device 3 is a management device on the business operator side which provides services (object distributing services) of distributing object management information that are the above-described basic information and individual information of various types of objects to the user communication devices 1 on a national basis. This server device 3 is connected to each terminal device 1 by way of the Internet and the wide area communication network 4 including a mobile communication network (wireless communication network) (not shown). Various types of beacon devices 2 where different patterns (pictures) have been printed corresponding to various types of objects (plurality of objects having different basic information) in a one-to-one relationship are sold. In the present embodiment, as the above-described object management information, 3D modeling data (three-dimensional coordinate data) corresponding to the basic pose (basic framework) of an object, data indicating poses (or consecutive pose changes) of an object associated with a plurality of object operations, and data regarding the colors and shapes of clothing associated with a plurality of clothing types are stored. Data corresponding to a required object operation and object clothing are read out, two-dimensional image data is generated based on 3D modeling data that is a base, and the generated image data is displayed by AR display.

Also, the server device 3 distributes basic information related to the type (object type) of a beacon device 2 possessed by a user and individual information corresponding to the beacon ID (individual object) of the beacon device 2 to the corresponding user communication device 1. Note that the beacon ID in the present embodiment includes information indicating the type (object type) of a beacon device 2 other than information identifying itself (the beacon device 2). For example, the upper digit of the beacon ID is the information indicating the type (object type) of the beacon device 2, and the lower digit is the terminal identification information (individual information).

The various types of objects in the present embodiment refers to, among figure images of objects shaped like humans, animals, characters and the like for viewing purposes by 3-Dimensional Computer Graphics (3DCG), figure images of objects shaped like humans and animals appearing in fiction such as novels, comics, movies, computer games, and the like (namely, 3DCG characters). The object, figure, and character are in a relationship of object>figure>character in the order of highest conception. However, in the present embodiment, a popular character that is a human or an animal is exemplarily shown as the object.

This favorite character (3DCG character) is represented by image data that performs a series of motions acquired by combining various types of basic motions determined in advance and variations thereof. For example, a human character spending their everyday life, namely, a human character whose motion consecutively changes in accordance with a current place, time, and the like for eating, sleeping, going to school and the like, a human character performing a dance, a pet character such as a dog, cat and the like. The individual characteristics of each 3DCG character gradually change by interaction (dialogue, contact) between the user and the character in addition to the basic property corresponding to the character type. Thus, by daily interaction with the characters, the users can grow them into characters having individual characteristics that are different for each user.

Figure 2:
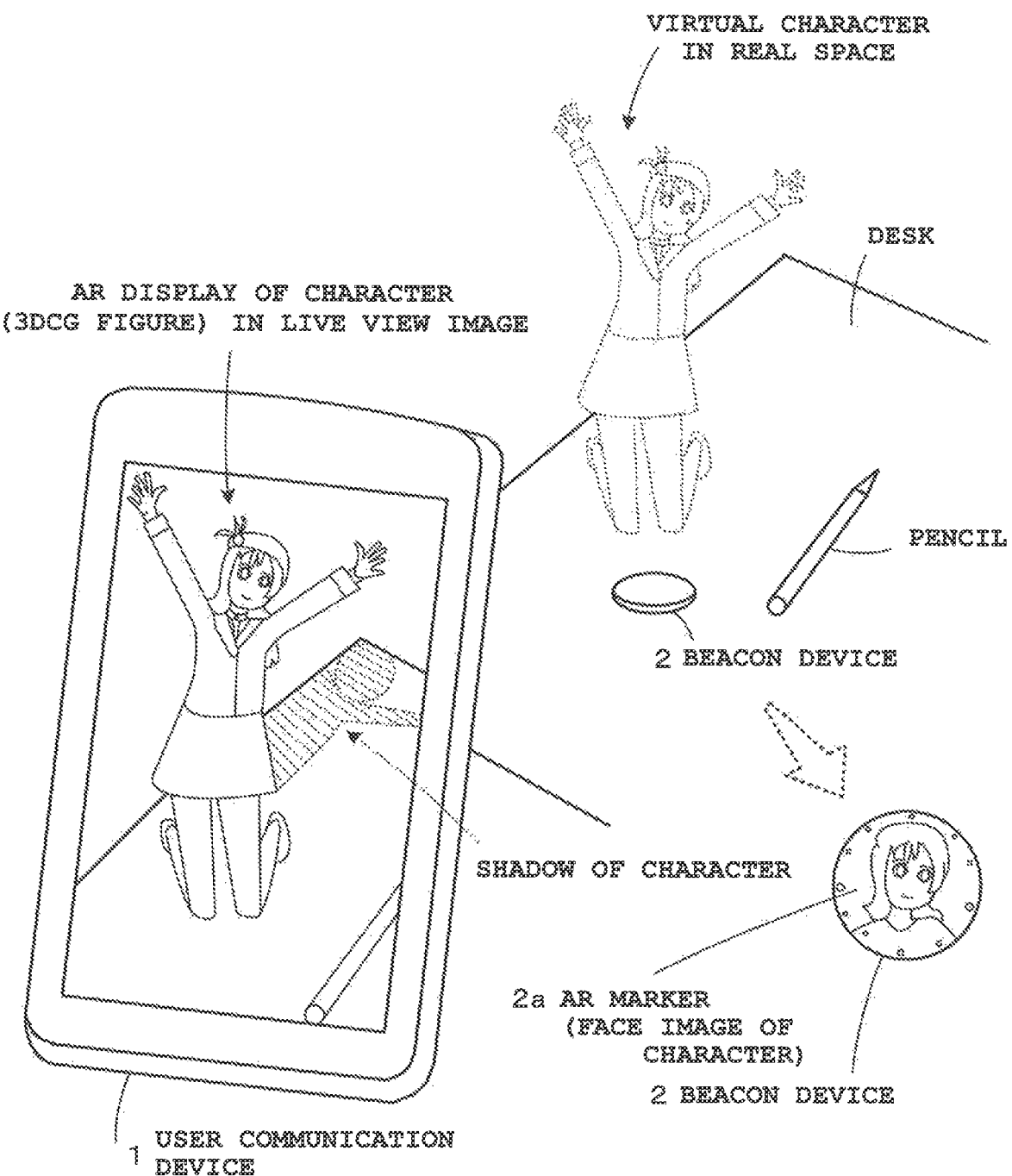
FIG. 2 is a diagram showing an example of the display of a user communication device 1 which can provide to the user a sense of reality as if an object (character) exists in real space.

FIG. 2 is a diagram showing an example of the display of one user communication device 1 that can provide to the user a sense of reality as if a character exists in real space.

In the example, one beacon device 2 and a pencil have been placed on a desk at home. On the surface (upper surface) of this beacon device 2, an Augmented Reality (AR) marker 2a, namely, image information (AR marker) 2a indicating its existing position in real space has been printed. The AR marker 2a of the example shows image information including a characteristic portion (human face portion) of a human character appearing in fiction such as movies and computer games and a pattern for identification assistance (e.g., small circles arranged on the peripheral edge portion). However, as a matter of course, the AR marker 2a is not limited thereto.

When the image capturing of the top of the desk is started by the imaging function of the user communication device 1 with the beacon device 2 being mounted on the desk, a live view image is displayed on the monitor screen (live view screen). The user communication device 1 analyzes the live view image and, when the AR marker 2a of the beacon device 2 therein is recognized, identifies the position and direction of the AR marker 2a in the live view image. Then, the user communication device 1 displays a 3DCG character corresponding to the beacon device 2 by AR display and superimposed on the position of the AR marker 2a. In this embodiment, the pose (three-dimensional pose) of the character is controlled to coincide with the direction of the AR marker 2a by the character being rotated corresponding to the orientation of the AR marker 2a. This AR function is a common technique that is used in a camera. Since it is a well-known technique, its details are omitted in the present embodiment.

Characters to be displayed by AR display are, for example, human characters spending their everyday lives or performing a dance with a series of motions acquired by various types of basic motions being combined. The example of the drawing shows a moment where a cute female character is jumping while dancing. By the AR display of the character, a sense of reality (sense of existence of virtual character) where the user feels as if the dancing female character indicated with a broken line in the drawing exists in real space (on the desk) can be provided to the user. Note that the character can emit a voice sound while making motions so as to speak to the user. By the motions and the sound voice of the 3DCG character, the sense of reality is increased.

In the shown example the characteristic portion (face portion) of the human character and the pattern for identification assistance have been drawn as the AR marker 2a. However, they are not necessarily required to be provided and either one may be omitted or substituted by a shaped portion of the object. Also, the face portion of the human may be a simple illustration of the face as long as the user can call up an image of the character. Namely, any structure can be adopted as long as the position and direction of the AR marker 2a and the type of the character can be identified. By the structure by which the user can call up an image of a character, the level of convenience when the user possesses a plurality of beacon devices 2 or purchases a beacon device 2 can be increased. Also, the present invention is not limited to the structure where an AR marker 2a is printed on the surface of a beacon device 2, and a structure may be adopted in which an adhesive sticker printed with an AR marker 2a is attached, or display means such as a liquid crystal display section is provided on a beacon device 2 and the display means displays an AR marker 2a.

When displaying a character in a live view image, each user communication device 1 performs processing that erases the image portion of the corresponding beacon device 2 shown in the live view image and corrects this portion. Here, correction processing is performed in which the image portion of the beacon device 2 is recognized as an unnecessary portion, the image portion is deleted, and the deleted portion is assimilated with the background. Also, when displaying the character in the live view image, the user communication device 1 performs processing of identifying a light source direction from the brightness distribution of the live view image, and inserting a shadow (human silhouette) of the character on the opposite side of the light source direction, so that this portion is corrected.

Figure 3:
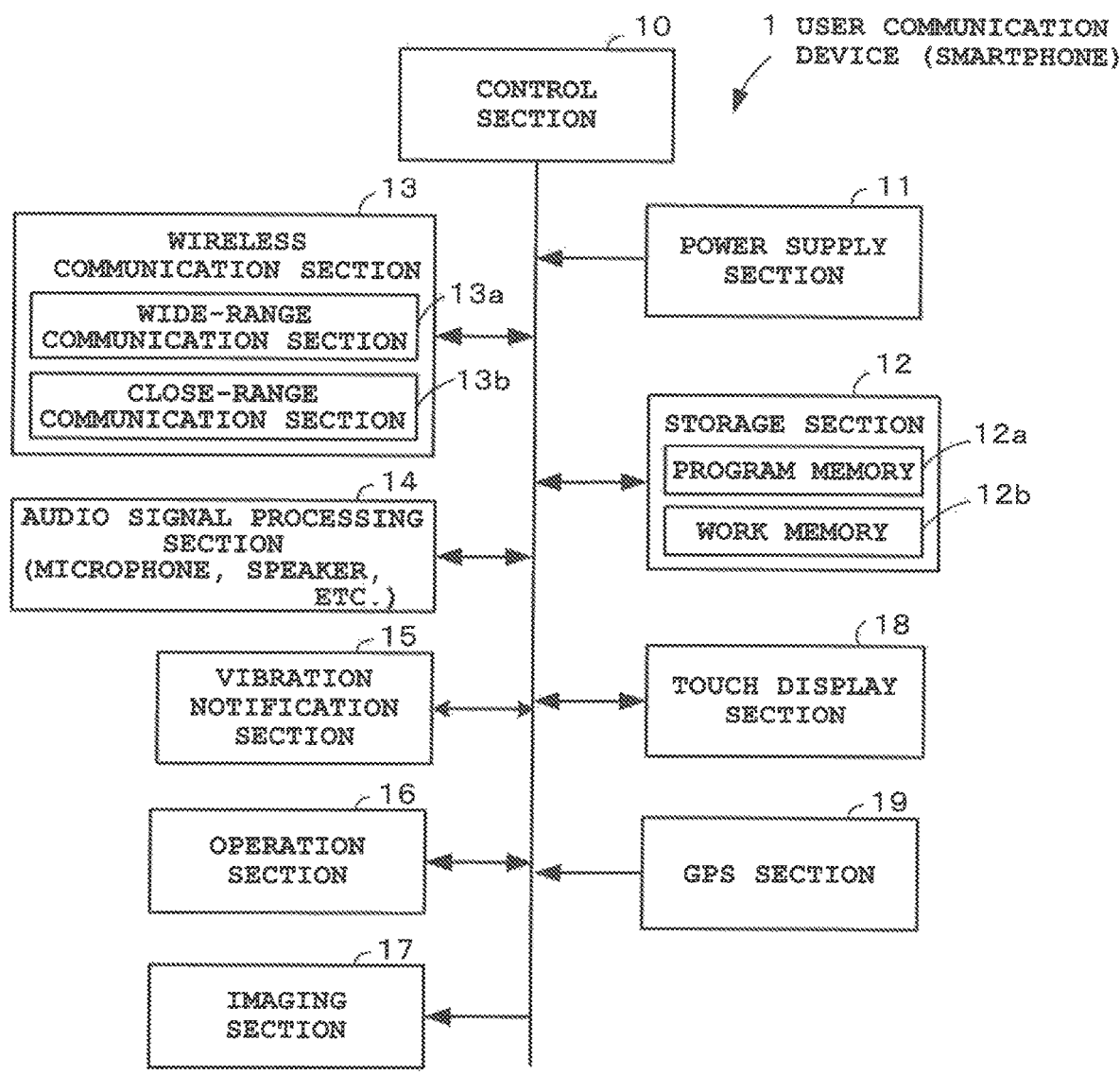
FIG. 3 is a block diagram showing basic components of the user communication device 1.

FIG. 3 is a block diagram showing basic components of one user communication device 1.

The user communication device (smartphone) 1 has a beacon communication function and a touch display function (a touch screen having a touch panel laminated on a display surface), in addition to its basic functions such as a call function, an electronic mail function, an Internet connection function, and a timing function (clock function, timer function). A control section 10 in FIG. 3 is a central processing section that operates by receiving power from a power supply section 11 equipped with a secondary battery (not shown), and controls the entire operation of the smartphone in accordance with various types of programs stored in a storage section 12.

The storage section 12 includes a program memory 12a, a work memory 12b and the like. The program memory 12a stores programs and various applications for actualizing the present embodiment based on operation procedures shown in FIG. 10, FIG. 11 and FIG. 13, and information necessary therefor. The work memory 12b is a work area that temporarily stores various information (e.g., flag, timer time, etc.) required to operate the smartphone. Note that the storage section 12 may be structured to include a detachable portable memory (recording media) such as an SD (Secure Digital) card, a USB (Universal Serial Bus) memory and the like. Alternatively, the storage section 12 may be structured to be partially provided on a predetermined external server (not shown).

A wireless communication section 13 in FIG. 3 includes a close-range communication section 13b in addition to a wide-range communication section 13a that is used for wide area communication by the call function, the electronic mail function, or the Internet connection function. The close-range communication section 13b transmits and receives a beacon signal (radio wave beacon or optical beacon) to and from the corresponding beacon device 2 within a communication available area. This close-range communication section 13b transmits a beacon signal including information (user ID) for identifying the device itself or receives a beacon signal from the beacon device 2. An audio signal processing section 14 in FIG. 3 includes a microphone, a speaker and the like, and is used for an output function for emitting the voice sound of a character in the present embodiment, in addition to the call function and an incoming call sound generation function. A vibration notification section 15 in FIG. 3 includes a vibration motor (not shown) and, in the present embodiment, is used for a function for notifying the user that connection with a beacon device 2 is detected, in addition to being used when an incoming call notification or an incoming email notification is given by vibration in place of an incoming call sound. An operation section 16 in FIG. 3 includes various push-button type keys such as a power supply button.

An imaging section 17 in FIG. 3 is a camera section capable of capturing a photographic subject in high definition by a subject image from an optical lens being formed by an imaging element (a CCD (Charge-Coupled Device), a CMOS (Complementary Metal Oxide Semiconductor) and the like). Although not shown, this imaging section 17 includes an imaging lens, the imaging element (a CCD, a CMOS and the like), various types of sensors, an analog processing section, and a digital processing section, and has an auto-focus function for performing zoom adjustment, automatic exposure adjustment, automatic focus position adjustment and the like. An image captured by the imaging section 17 is subjected to image compression processing where it is compressed by the control section 10 so as to be acquired as a file, and then recorded and stored in the recording medium of the storage section 12.

A touch display section 18 in FIG. 3, which constitutes a touch display function, has a structure where a touch panel has been laminated and arranged on a display screen. This touch display section 18 is an input display device in which various types of software keys (touch keys) have been allocated and arranged thereon and which displays function names or icons, selects an operation mode desired by the user from among various types of operation modes (an imaging mode where image capturing can be performed, an AR display mode where AR display can be performed, a playback mode where a stored image can be replayed and the like) so as to switch a current mode, and senses a touch operation (tap, flick or the like) by a finger or the like so as to input an operation signal corresponding to the touch operation. A Global Positioning System (GPS) section 19 in FIG. 3 is a position measuring system that measures a current position using a control station of a ground system/satellite system. In the above-described AR display mode, the control section 10 acquires current position information (location information) from the GPS section 19, compares the current position information with position information (such as home location information) registered in advance, judges whether the user is at home or outside the home, and identifies the current location if the user is outside their home.

Figure 4:
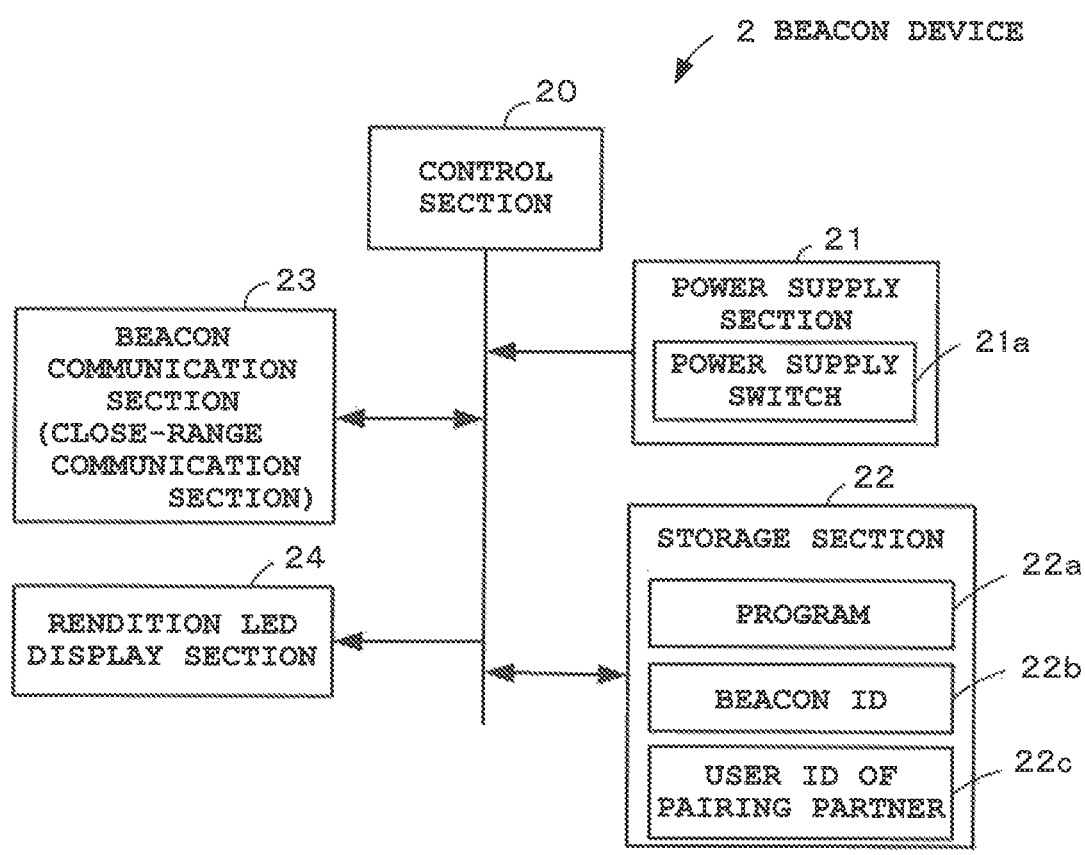
FIG. 4 is a block diagram showing basic components of a beacon device 2.

FIG. 4 is a block diagram showing basic components of one beacon device 2. A control section 20 in FIG. 4 is a central processing section that operates by receiving power from a power supply section 21 equipped with a secondary battery or a solar battery (not shown) and a power supply switch 21a, and controls the entire operation of the beacon device in accordance with various types of programs stored in a storage section 22. The storage section 22 includes a program memory 22a, a memory 22b that stores a beacon ID for identifying the device itself, a memory 22c that stores a user ID indicating a pairing partner set in advance, and the like. The program memory 22a stores programs and various applications for actualizing the present embodiment based on operation procedures shown in FIG. 9 and FIGS. 14A, 14B and 14C, and information necessary therefor.

A beacon communication section 23 in FIG. 4 includes a close-range communication section that transmits and receives a beacon signal (radio wave beacon or optical beacon) to and from the corresponding user communication device 1, and periodically transmits a beacon signal including the beacon ID read out from the storage section 22 once every few seconds or receives a beacon signal transmitted from the user communication device 1. A rendition Light Emitting Diode (LED) display section 24 in FIG. 4 emits rendition light by the lighting or flashing of various lights in response to the reception of a beacon signal transmitted from the user communication device 1 and an LED control signal, and notifies that AR display is performed on the user communication device 1 side.

Figure 5:
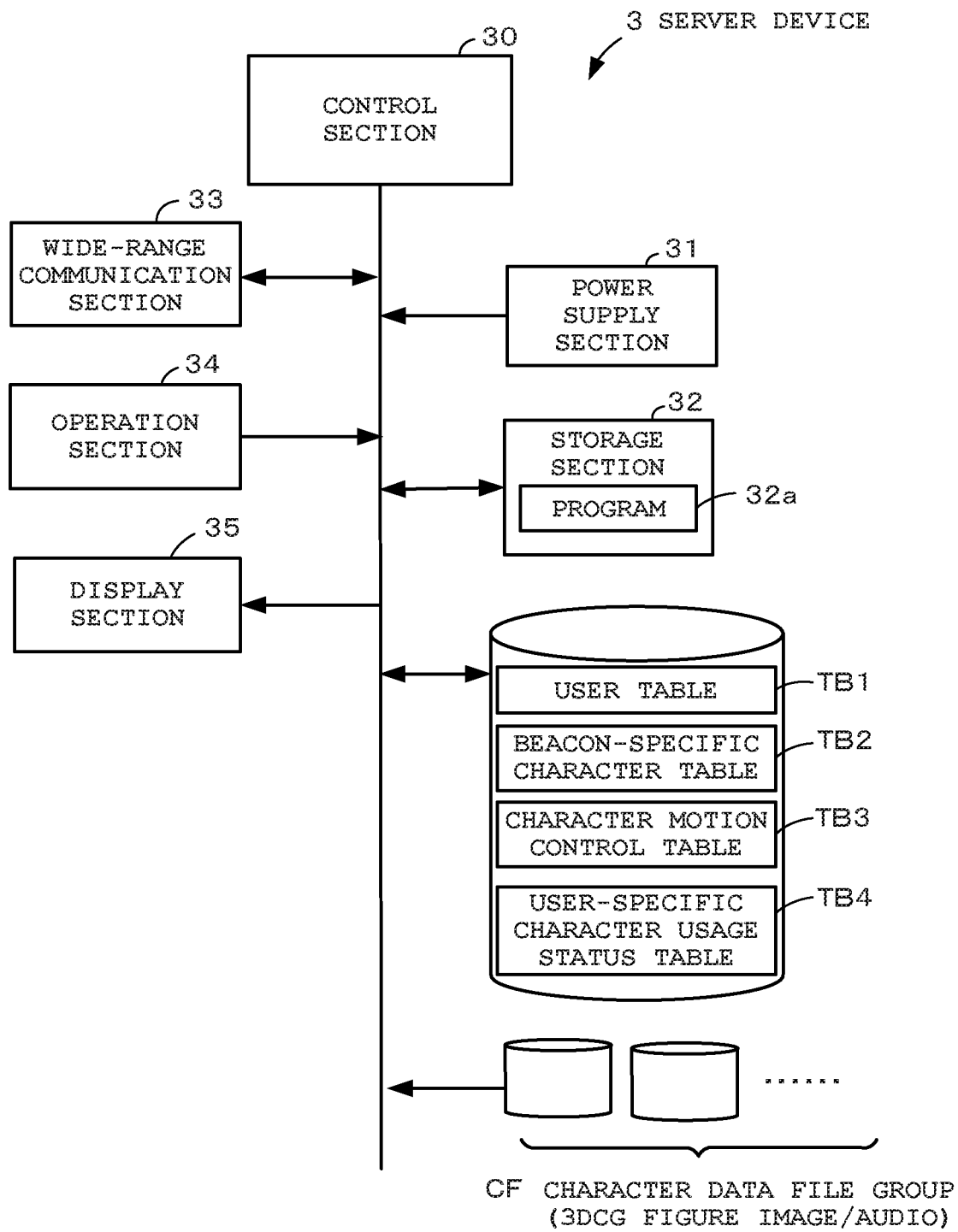
FIG. 5 is a block diagram showing basic components of the server device 3.

FIG. 5 is a block diagram showing basic components of the server device 3. A control device 30 in FIG. 5 is a central processing section that operates by receiving power from a power supply section 31, and controls the entire operation of the server device 3 in accordance with various types of programs stored in a storage section 32. The storage section 32 includes a program memory 32a and the like. The program memory 32a stores programs and various applications for actualizing the present embodiment based on operation procedures shown in FIG. 12 and FIG. 13, and information necessary therefor.

A wide-range communication section 33 in FIG. 5 performs bidirectional communication by being connected to each user communication device 1 via a wide area communication network 4 constituted by the Internet and a mobile communication network (wireless communication network). In an external storage device (not shown) externally connected to the server device 3, various types of tables constituting a database for performing an object distribution service are provided, such as a USER TABLE TB1, a BEACON-SPECIFIC CHARACTER TABLE TB2, a CHARACTER MOTION CONTROL TABLE TB3 and a USER-SPECIFIC CHARACTER USAGE STATUS TABLE TB4. In addition, a CHARACTER DATA FILE GROUP CF (3DCG figure image/audio) is provided therein.

FIG. 6A is a diagram describing the USER TABLE TB1. The USER TABLE TB1 stores and manages information related to member users using the object distribution service, and includes fields of "USER ID", "USER NAME", "OTHER USER INFORMATION" and "BEACON ID". The "USER ID", the "USER NAME" and the "OTHER USER INFORMATION" are information (information identifying a user communication device 1, a user name, an email address and the like) which are unique to a user and transmitted from a user communication device 1 at the time of user registration, and used at the time of various guidance and service implementation. The "USER ID" is terminal device identification information transmitted from a user communication device 1 at the time of access to the server device 3, and the "USER ID" can be used by different users as long as they use the same user communication device 1.

The "BEACON ID" is information identifying a beacon device 2 possessed by a user. For example, at the time of pairing with a beacon device 2, a user communication device 1 transmits a beacon ID acquired from the beacon device 2 and its own user ID to the server device 3. Then, the server device 3 registers the received beacon ID and the user ID in the USER TABLE TB1 as a correspondence relationship (a combination relationship of pairing partners) of the user communication device 1 and the beacon device 2. Namely, the received beacon ID is registered as a pairing partner, in the field of "BEACON ID" corresponding to the received user ID.

FIG. 6B is a diagram describing the BEACON-SPECIFIC CHARACTER TABLE TB2. The BEACON-SPECIFIC CHARACTER TABLE TB2 associates the beacon devices 2 with the characters. For example, 50 types of characters are associated with 50 types of beacon devices 2 or an individual character is associated with an individual beacon device 2 in a one-to-one relationship. This beacon-specific character table TB2 includes fields of "BEACON ID", "AR MARKER", "CHARACTER ID", and "CHARACTER NAME". The "BEACON ID" is terminal device identification information identifying each beacon device 2, and the "AR MARKER" is image information (face image and pattern) indicating an AR marker 2a provided on the surface of a beacon device 2 and is information identifying the type of a character. The "CHARACTER ID" is information identifying each character, and the "CHARACTER NAME" is a name thereof. This character name is a common name indicating the type of a character in an initial state, and can be changed to a name preferred by a user at the time of user registration. Note that, every time an individual character is added, the server device 3 additionally registers (new registration) a correspondence relationship of the character and the corresponding beacon device 2 in the BEACON-SPECIFIC CHARACTER TABLE TB2.

FIG. 7 is a diagram describing the CHARACTER MOTION CONTROL TABLE TB3. The CHARACTER MOTION CONTROL TABLE TB3 stores and manages information for controlling motions of each character, and includes fields of "CHARACTER ID" (AR marker) and "CHARACTER MOTION CONTROL INFORMATION". The "CHARACTER MOTION CONTROL INFORMATION" includes fields of "BASIC MOTION NAME", "VARIATION", and "APPEARANCE CONDITION". The "BASIC MOTION NAME" is, for example, information specifying character data (image data and audio data constituting a basic motion) that performs a basic motion corresponding to "MEAL", "BATH", "READING", "DANCE" or the like. Namely, this is basic information for managing the basic appearance and motion for each character type (when the same type of character, the basic appearance and motion are in common).

The "VARIATION" is name information for specifying character data (image data and audio data constituting variation data) that performs a motion acquired by a basic motion being changed. Further, in the present embodiment, as conditions ("REPLACEMENT CONDITION") for performing a variation motion instead of a basic motion, three condition fields, namely, "CLOSENESS", "TAP REACTION", and "USAGE ENVIRONMENT" are provided. The "CLOSENESS" is a field for specifying a variation motion by changing a basic motion based on the closeness of a user and a character. In the example, in a case where the basic motion is "MEAL", the variation "CONTENTS OF MEAL ARE CHANGED" is specified according to the "CLOSENESS". In a case where the basic motion is "DANCE", the variation "DIFFICULTY IS CHANGED" is specified according to the "CLOSENESS".

The "TAP REACTION" is information for specifying a variation motion acquired by a basic motion being changed, when the touch screen is tapped during AR display. In the example, in a case where the basic motion is the "MEAL", the variation "STOP EATING AND TALK ABOUT IMPRESSION" is specified as a "TAP REACTION". In a case where the basic motion is "BATH", the variation "HUMMING" is specified. In the present embodiment, tap reactions when a tap operation of touching an arbitrary point and immediately releasing the finger is performed are shown. However, the present invention is not limited thereto and the reactions may occur when a touch jester is performed, such as a swipe operation of touching and moving, a pinch-in operation of touching with a plurality of fingers and narrowing spaces between fingers, and a pinch-out operation of touching with a plurality of fingers and widening spaces between fingers. Also, the tap reactions are not limited to those achieved by the voice of a character, and may be reactions made by a special motion.

The "USAGE ENVIRONMENT" indicates a current environment (SEASON, LOCATION) where a user communication device 1 is being used. Here, a current season is judged based on timing information acquired by the timing function, and a current location is judged based on position information acquired by the GPS section 19. Note that this current location may be acquired by the GPS section 19. As such, based on a current environment (SEASON, LOCATION), a judgment is made as to whether summer or winter, home or outside and the like. When the user is outside, a judgment is made as to whether the user is on a beach, whether the user is in a city, whether the user is in a specific facility and the like. Then, based on the judgment result, a variation is specified by which the clothing (for example, a swimming suit in the summertime) of the character is changed. Note that the "USAGE ENVIRONMENT" is not limited to a season or a location, and may be the temperature or the weather. In this case, the clothing of the character can be changed based on the temperature or the weather. Also, a clothing change is not limited to a change of clothing, and may be a change of the character's accessories and the like.

The "APPEARANCE CONDITION" is a field for storing conditions for making character data (a basic motion or its variation) appear (display). In the present embodiment, three condition fields, namely, "TIME BAND", "LOCATION" and "APPEARANCE RATE" are included in the "APPEARANCE CONDITION". When all the three conditions are satisfied, a basic motion or its variation will appear (displayed). For example, in a case where the "BASIC MOTION NAME" is the "MEAL", when "NIGHT MEAL TIME BAND" (18:00 to 20:00) has been stored under "TIME BAND", "NO SPECIFICATION" has been stored under "LOCATION" and "ONCE A DAY" has been stored under "APPEARANCE RATE", a character having a meal will appear in the night time band once a day.

Also, in the case where the "BASIC MOTION NAME" is "BATH", when "20:00 to 24:00" has been stored under "TIME BAND", "HOME" has been stored under "LOCATION" and "ONCE A DAY" has been stored under "APPEARANCE RATE", a character taking a bath will appear between 20:00 and 24:00 at home once a day. Moreover, in a case where the "BASIC MOTION NAME" is the "READING", when "NO SPECIFICATION" has been stored under "TIME BAND" and "LOCATION" and "THREE TIMES A DAY" has been stored under "APPEARANCE RATE", a character reading a book will appear up to three times a day regardless of the time band and the location.

Figures 8A, 8B:
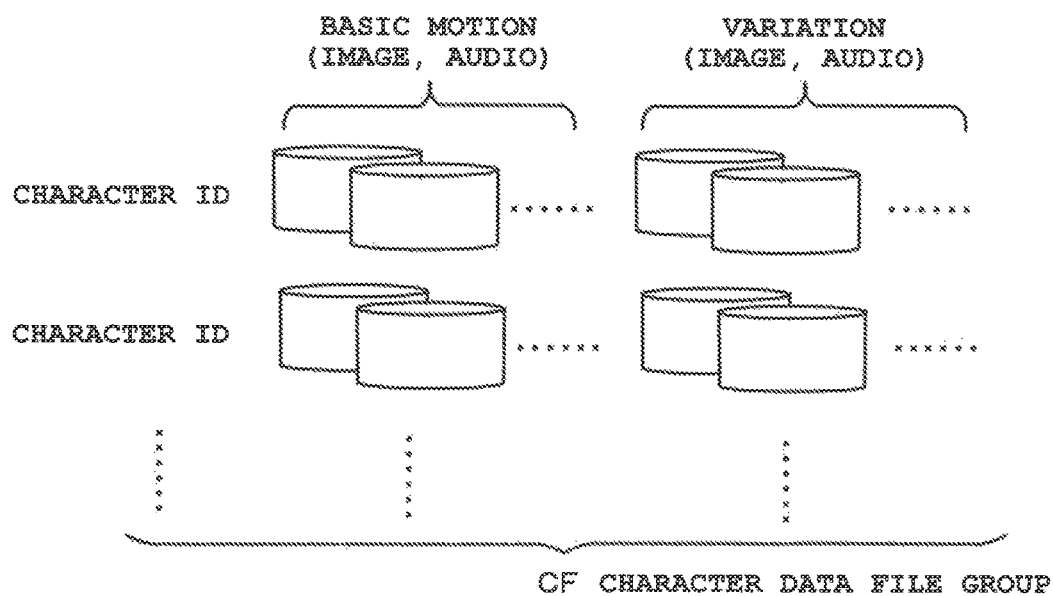
FIG. 8A is a diagram describing a USER-SPECIFIC CHARACTER USAGE STATUS TABLE TB4.
FIG. 8B is a diagram describing a CHARACTER DATA FILE GROUP CF.

FIG. 8A is a diagram describing the USER-SPECIFIC CHARACTER USAGE STATUS TABLE TB4. The USER-SPECIFIC CHARACTER USAGE STATUS TABLE TB4, which stores and manages the usage status of each character for each user, includes fields of "USER ID", "CHARACTER ID", "BASIC MOTION-SPECIFIC CHARACTER USAGE STATUS", and "OTHER STATE INFORMATION". The "CHARACTER USAGE STATUS" is a field for storing the usage status of characters sorted by basic motion, and includes fields of "CLOSENESS OF USER AND CHARACTER" and "NUMBER OF ACCESSES (PER DAY)". This "CLOSENESS OF USER AND CHARACTER" further includes two fields, namely, "ACCESS TIME CUMULATIVE TOTAL VALUE" and "ACCESS FREQUENCY". The "ACCESS TIME CUMULATIVE TIME TOTAL VALUE" indicates the cumulative time of the AR display of an accessed character corresponding to a beacon device 2 from the purchase of the beacon device 2 to the current time point, and the "ACCESS FREQUENCY" indicates the number of times a character corresponding to a beacon device is accessed and subjected to AR display in a predetermined period of time (within one month). The "OTHER STATE INFORMATION" is information managing states that change for each character other than the "BASIC MOTION-SPECIFIC CHARACTER USAGE STATUS" (the current clothing of a character, a list of clothing that can be worn by a character at that time point and the like).

When closeness of the user is to be judged based on the "ACCESS TIME CUMULATIVE TOTAL VALUE", closeness is judged to be low if the cumulative total value is smaller than a first threshold value X1. Also, closeness is judged to be normal if the cumulative total value is greater than or equal to the first threshold value X1 and smaller than a second threshold value X2. Moreover, closeness is judged to be high if the cumulative total value is greater than or equal to the second threshold value X2. Similarly, when closeness is judged based on the "ACCESS FREQUENCY", closeness is judged to be low if the frequency is smaller than a first threshold value Y1. Also, closeness is judged to be normal if the frequency is greater than or equal to the first threshold value Y1 and smaller than a second threshold value Y2. Moreover, closeness is judged to be high if the frequency is greater than or equal to the second threshold value Y2. Here, closeness of the "ACCESS TIME CUMULATIVE TOTAL VALUE" and closeness of the "ACCESS FREQUENCY" are compared with each other, and the higher closeness is taken as the character usage status. For example, if one closeness is "high" and the other closeness is "normal", closeness is judged to be "high" for the character usage status. If one closeness is "normal" and the other closeness is "low", closeness is judged to be "normal" for the character usage status. The "NUMBER OF ACCESSES (PER DAY)" indicates the total number of times a character corresponding to a beacon device is accessed per day.

FIG. 8B is a diagram describing the CHARACTER DATA FILE GROUP CF. The CHARACTER DATA FILE GROUP CF, which constitutes a data library for storing and managing various types of character data, stores and manages various types of "BASIC MOTION" (3DCG figure images and audio data) corresponding to a "CHARACTER ID" (AR marker) for each character type, and also stores and manages various types of "VARIATION" (3DCG figure images and audio data). When a download request for character data is received from a user communication device 1, the server device 3 references the CHARACTER DATA FILE GROUP CF and distributes the requested character data (various types of basic motions and variation data) to the user communication device 1 that is the requesting source.

Next, the operation concept of the object display system in the present embodiment is described with reference to flowcharts shown in FIG. 9 to FIG. 13. Here, each function described in these flowcharts is stored in a readable program code format, and operations based on these program codes are sequentially performed. Also, operations based on the above-described program codes transmitted over a transmission medium such as a network can also be sequentially performed. Namely, the characteristic operation of the present embodiment can be performed using programs and data supplied from an outside source over a transmission medium, in addition to a recording medium.

Figure 9:
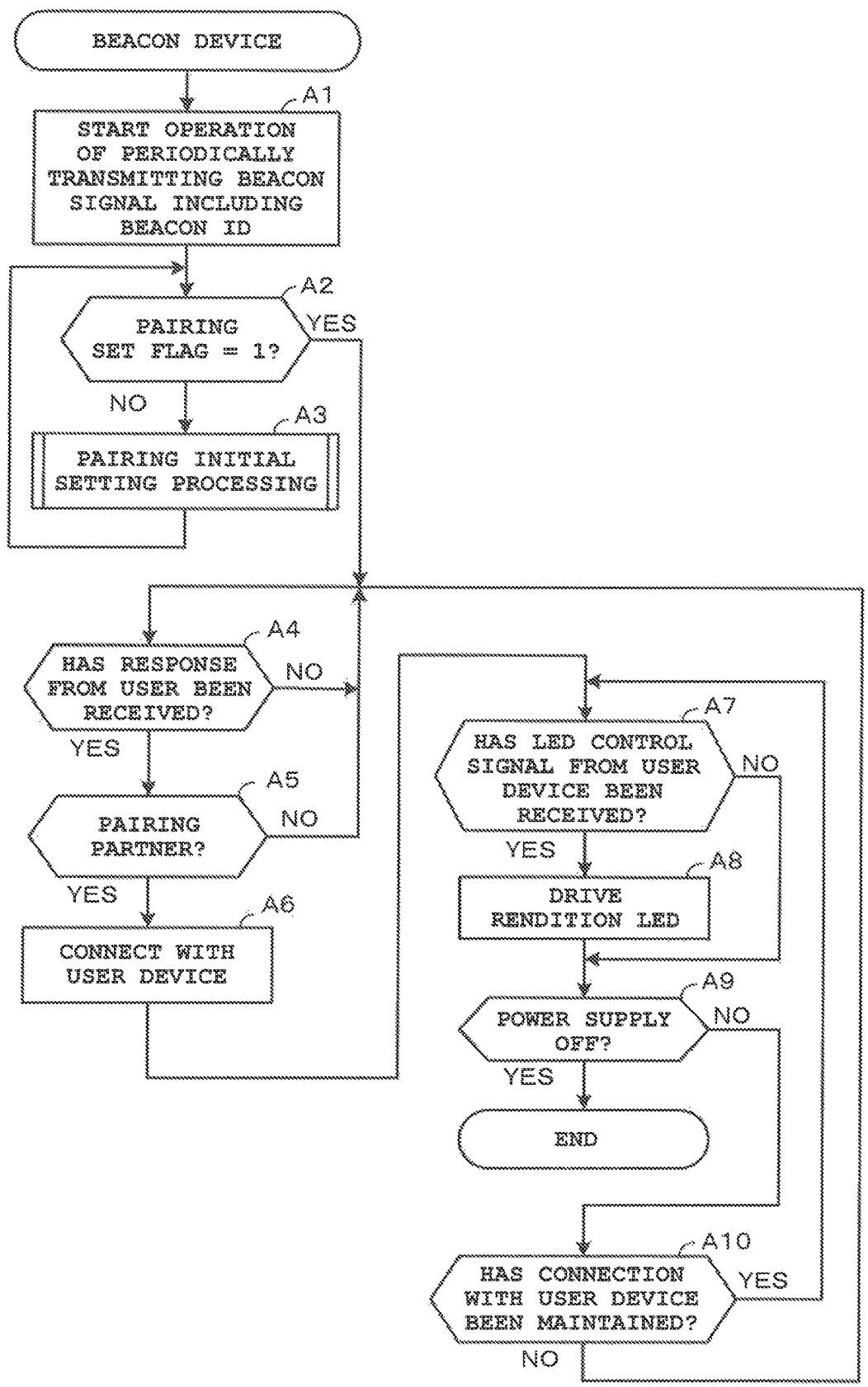
FIG. 9 is a flowchart outlining the entire operation of the beacon device 2.
Figure 10:
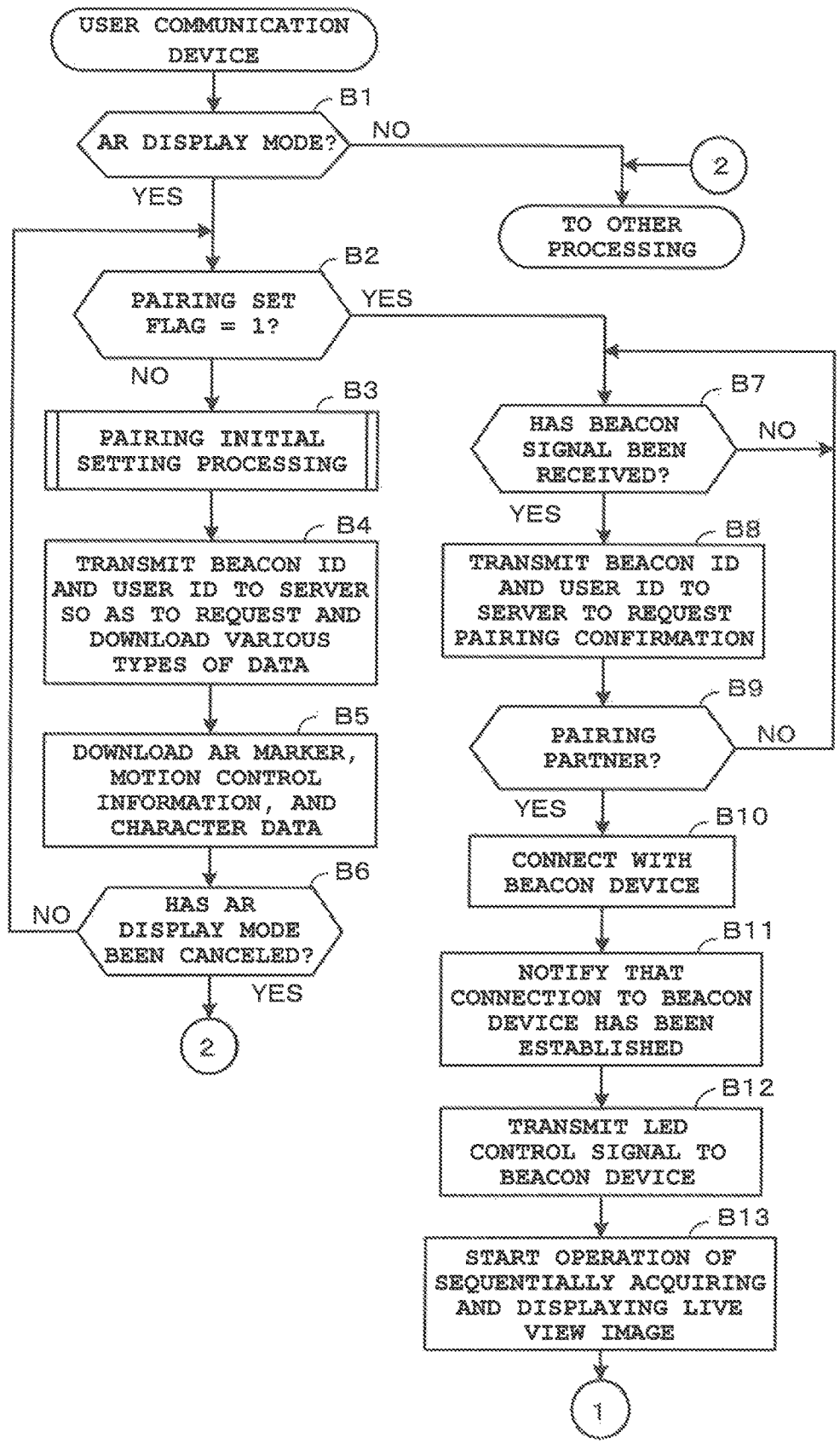
FIG. 10 is a flowchart showing an operation of the user communication device 1 (characteristic operation of the present embodiment).
Figure 11:
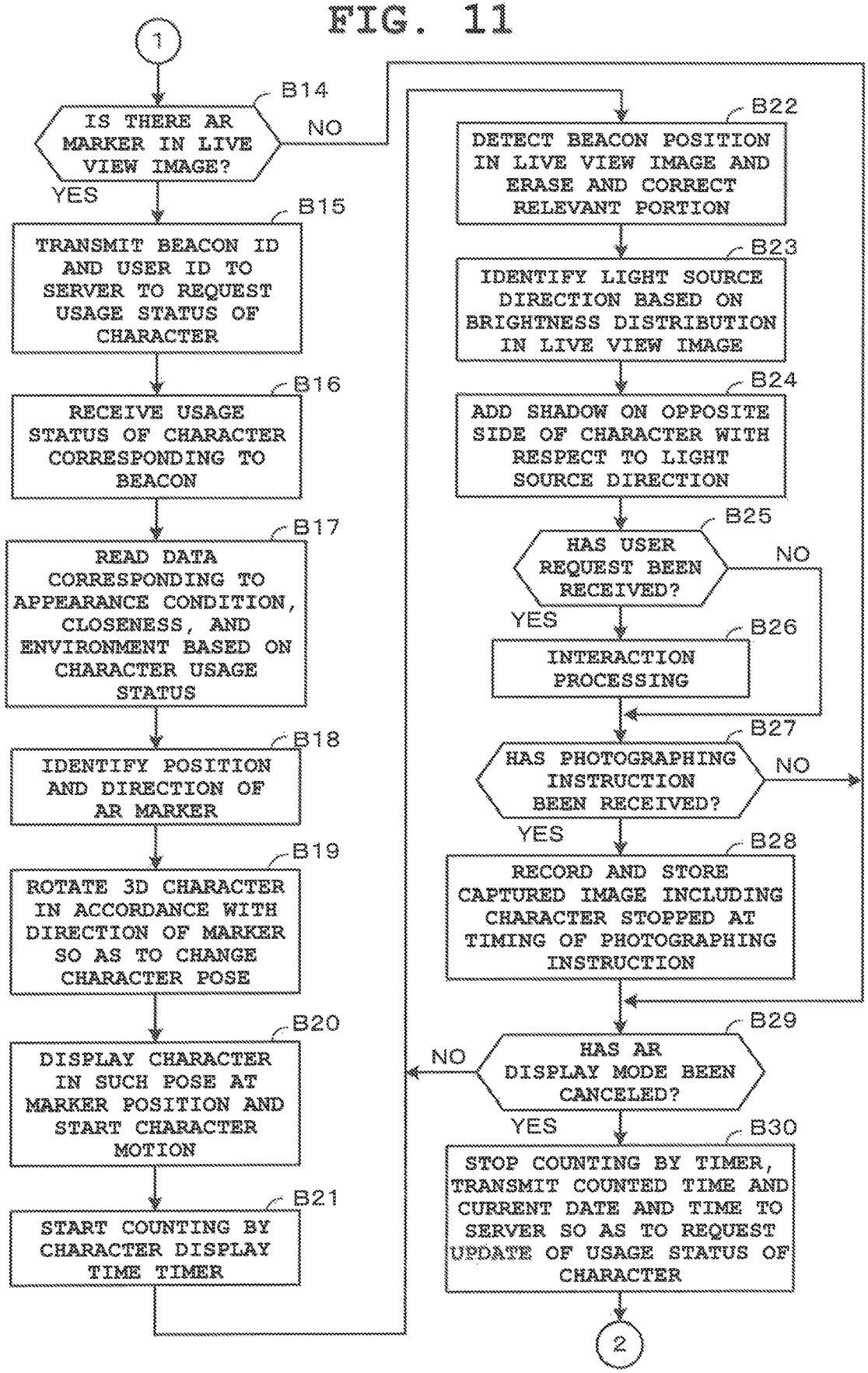
FIG. 11 is a flowchart following the operation in FIG. 10.
Figure 12:
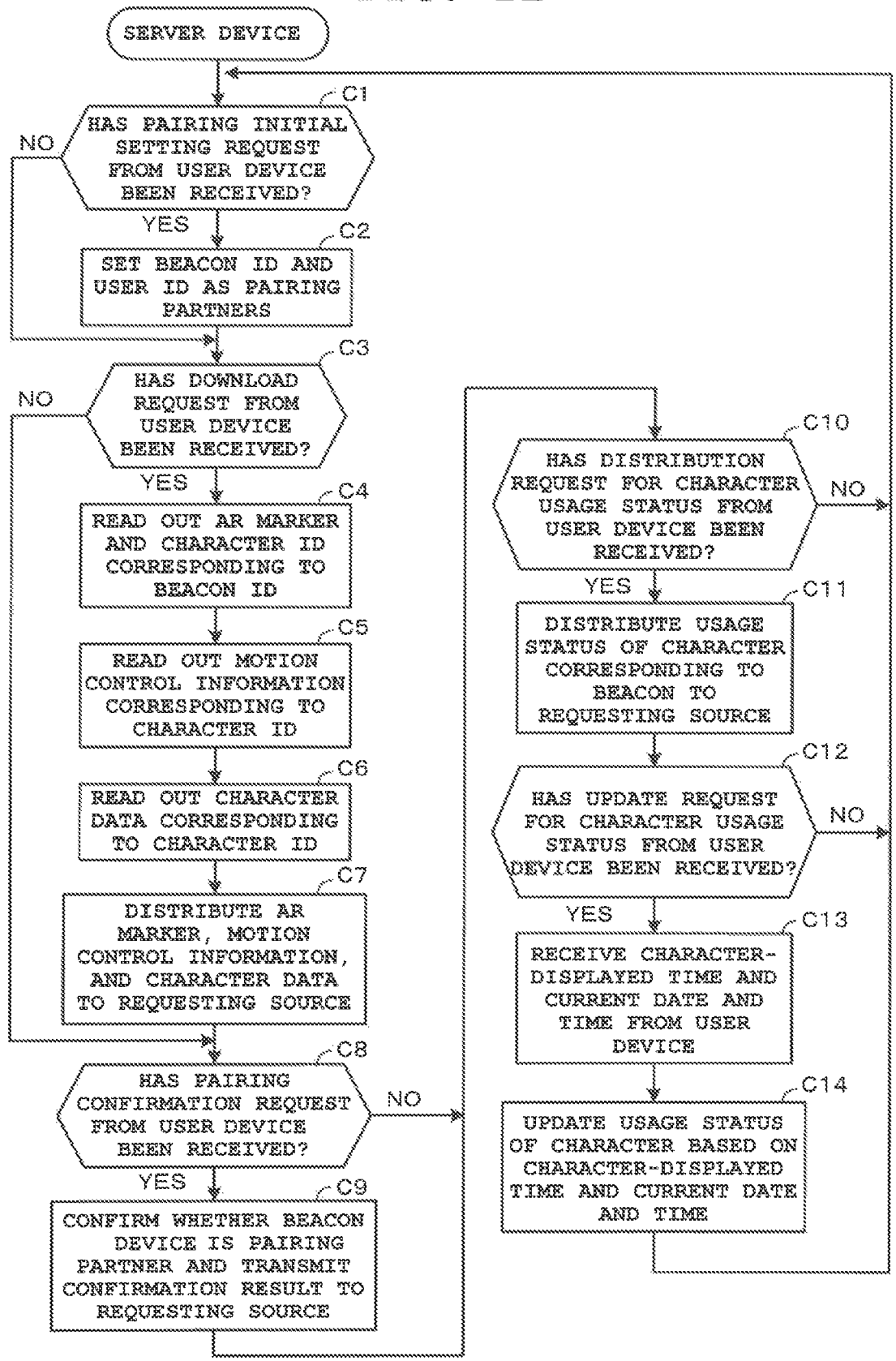
FIG. 12 is a flowchart outlining the entire operation of the server device 3.

FIG. 9 is a flowchart outlining the entire operation of one beacon device 2, and FIG. 10 and FIG. 11 are flowcharts showing the operation of one user communication device 1 (characteristic operation of the present embodiment). FIG. 12 is a flowchart outlining the entire operation of the server device 3.

FIG. 9 shows the operation of the beacon device 2 which is started in response to power-on. First, in response to this power-on, the beacon device 2 starts (Step A1 in FIG. 9) an operation of periodically (e.g., once every few seconds) transmitting a beacon signal including its beacon ID, and then judges whether the value of a pairing set flag (not shown) is "1" (flag=ON) (Step A2).

This pairing set flag is set to "1" (flag=ON) when pairing initial setting processing (described later) is performed between the beacon device 2 and the corresponding user communication device 1, and the value thereof is stored and held even after the power is turned off (hereinafter the same). Here, since this is a case where the beacon device 2 is to be newly introduced (after new purchase), the value of the pairing set flag is "0" (flag=OFF) (NO at Step A2), and therefore the procedure proceeds to pairing initial setting processing (Step A3).

FIG. 10 and FIG. 11 show the operation of the user communication device 1 which is started in response to power-on. First, in response to this power-on, the user communication device 1 judges whether the AR display mode is the current operation mode (Step B1 in FIG. 10). When the current mode is not the AR display mode the user communication device 1 proceeds to other processing mode (NO at Step B1). When the AR display mode is the current mode (YES at Step B1), the user communication device 1 judges whether the value of a pairing set flag (not shown) is "1" (flag=ON) (Step B2), as in the case of the beacon device 2 side. Here, since this is a case where the beacon device 2 is to be newly introduced (after new purchase), the value of the pairing set flag is "0" (flag=OFF) (NO at Step B2), and therefore the procedure proceeds to pairing initial setting processing (Step B3) described later.

Figure 13:
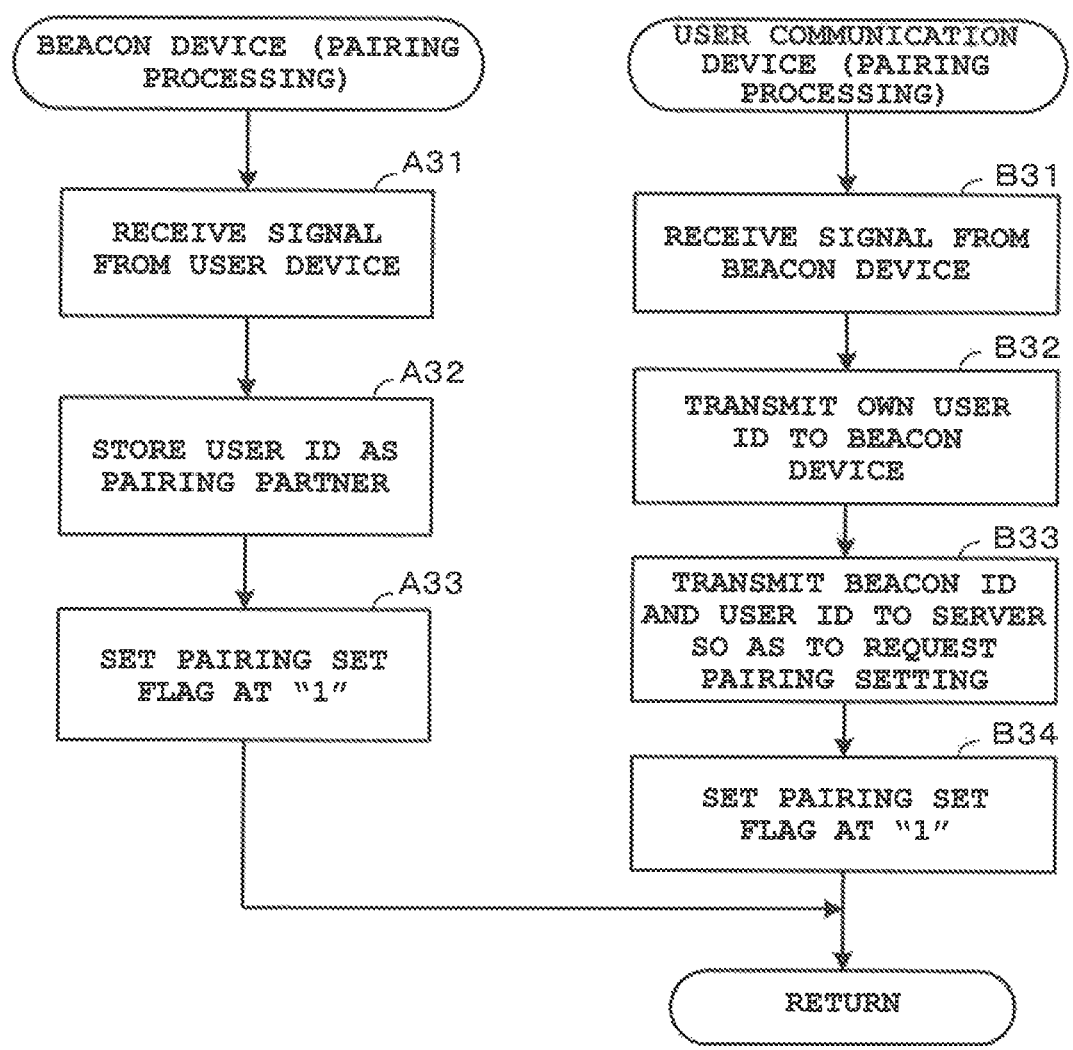
FIG. 13 is a flowchart describing details of pairing processing (Step A3 in FIG. 9, Step B3 in FIG. 10) that is performed between the user communication device 1 and the beacon device 2.

This pairing initial setting processing is performed by mutual communication using beacon signals between the beacon device 2 and the user communication device 1, with the beacon device 2 and the user communication device 1 being placed close to each other in a communication available area (Step A3 and Step B3). FIG. 13 is a flowchart describing details of this pairing initial setting processing (Step A3 and Step B3). First, when a beacon signal transmitted from the beacon device 2 is received (Step B31), the user communication device 1 transmits a beacon signal including its user ID (Step B32).

Next, the user communication device 1 stores the received beacon ID as that of a pairing partner, transmits the received beacon ID and its user ID to the server device 3, makes a request for pairing setting (Step B33), and performs processing of setting the value of the pairing set flag on the user communication device 1 side at "1" so as to turn ON the flag (Step B34). Note that, in the configuration of the present embodiment, the user communication device 1 and the beacon device 2 are associated with each other in a one-to-one relationship as pairing partners. Accordingly, the setting of the value of the pairing set flag at "1" is performed after the user communication device 1 and the beacon device 2 are associated with each other in a one-to-one relationship (pairing processing).

When the beacon signal transmitted from the user communication device 1 is received (Step A31), the beacon device 2 performs processing of storing the user ID included in the beacon signal in the storage section 22 as that of a pairing partner (Step A32), and then performs processing of setting the value of the pairing set flag on the beacon device 2 side at "1" so as to turn ON the flag (Step A33).

When the pairing setting request from the user communication device 1 is received (Step C1 in FIG. 12), the server device 3 performs pairing initial setting processing (Step C2) of additionally registering (new registration) the correspondence relationship (combination relationship of pairing) of the beacon ID and the user ID received from the user communication device 1 in the USER TABLE TB1 in response to the setting request. The pairing herein refers to both pairing at a communication level where the beacon device 2 and the user communication device 1 limit their communication partners to each other and pairing at a service level where a device that receives the service provided by the server device 3 is registered.

After the above-described pairing initial setting processing (Step A3) is ended, the beacon device 2 returns to Step A2. This time, the pairing set flag is "1" (YES at Step A2), and therefore the beacon device 2 proceeds to the next Step A4, and enters a state of waiting for a response from the user communication device 1.

Also, after the above-described pairing initial setting process (Step B3) is ended, the user communication device 1 transmits the beacon ID and its user ID to the server device 3 so as to request and download character data and the like associated with the beacon device 2 (Step B4).

When the download request from the user communication device 1 is received (YES at Step C3 in FIG. 12), the server device 3 references the BEACON-SPECIFIC CHARAC-TER TABLE TB2 based on the beacon ID received at the time of the request, and reads out the "AR MARKER" and the "CHARACTER ID" corresponding to the beacon ID (Step C4). Next, the server device 3 references the CHARACTER MOTION CONTROL TABLE TB3 based on the "CHARACTER ID" and reads out the corresponding "CHARACTER MOTION CONTROL INFORMATION" ("BASIC MOTION NAME", "VARIATION" and "APPEARANCE CONDITION") (Step C5). In addition, the server device 3 references the CHARACTER DATA FILE GROUP CF based on the "CHARACTER ID" and reads out the corresponding character data (various types of "BASIC MOTION" and "VARIATION") (Step C6). Then, the server device 3 performs processing of distributing the read various types of data, namely, the AR marker corresponding to the beacon ID and the character motion control information and the character data corresponding to the character ID to the user communication device 1 that is the requesting source (Step C7).

When the various types of data such as the character data distributed from the server device 3 is received, the user communication device 1 performs download processing of storing the AR marker corresponding to the beacon ID and the character motion control information and the character data corresponding to the character ID in the storage section 12 (Step B5 in FIG. 10). As such, in the pairing initial setting, the user communication device 1 performs, as initial processing, the download processing of receiving and acquiring the character data and the like corresponding to the beacon terminal serving as the pairing partner from the server device 3 and storing them in its own storage section 12.

Next, the user communication device 1 judges whether the AR display mode has been cancelled by a user operation so as to switch the current mode to another operation mode (Step B6). Here, when the AR display mode has been canceled (YES at Step B6), the user communication device 1 proceeds to processing corresponding to this operation mode. Conversely, when the AR display mode has not been canceled (NO at Step B6) the user communication device 1 returns to Step B2 described above. In this case, since the pairing set flag is "1" (YES at Step B2), the user communication device 1 proceeds to the next Step B7, and enters a state of waiting for the reception of a beacon signal from the beacon device 2.

More specifically, the user communication device 1 judges whether a beacon signal (including the beacon ID) transmitted from the beacon device 2 has been received, namely, judges whether the user has entered a communication available area of the beacon device 2 (e.g., radius of 5 meters). For example, when the user of the user communication device 1 returns to his or her room (own room) where the user's beacon device 2 is located after temporarily leaving there, a beacon signal from the beacon device 2 can be received. When a beacon signal from the beacon device 2 is received (YES at Step B7), the user communication device 1 transmits the received beacon ID and its user ID to the server device 3 so as to make a confirmation request as to whether the beacon device 2 is a pairing partner (Step B8), and judges whether the beacon device 2 is a pairing partner based on a confirmation result transmitted from the server device 3 in response to the request (Step B9). Here, not only the confirmation of pairing at the communication level but also the confirmation of pairing at the service level is made. In a case where one user possesses a plurality of user terminals (such as a smartphone and a watch type wrist terminal), the confirmation of pairing at only one of these levels may be made based on whether only one of the terminals is used for the present service or both of the terminals are used for the present service.

When the confirmation request as to whether the beacon device 2 is a pairing partner is received from the user communication device 1 (YES at Step C8 in FIG. 12), the server device 3 references the USER TABLE TB1 based on the beacon ID and the user ID received at the time of the confirmation request, and judges whether the correspondence relationship (combination relationship) of the received beacon ID and the user ID has been registered in the USER TABLE TB1. When the correspondence relationship has been registered, the server device 3 confirms that the beacon device 2 is a pairing partner, and transmits the confirmation result to the user communication device 1 that is the requesting source (Step C9).

In a case where the confirmation result from the server device 3 is indicating that the beacon device 2 is not a pairing partner (NO at Step B9 in FIG. 10), the user communication device 1 returns to Step B7 to disregard the beacon signal received this time. However, when the confirmation result indicates that the beacon device 2 is a pairing partner (YES at Step B9), the user communication device 1 judges the beacon device 2 as a connection target and transmits a response including its own user ID to the beacon device 2 (Step B10) so as to indicate that the beacon signal has been received normally.

When the response is received from the user communication device 1 (YES at Step A4 in FIG. 9), the beacon device 2 compares the user ID received with the response and the user ID stored as that of the pairing partner and judges whether the response has been transmitted from the pairing partner (Step A5). When it is not from the pairing partner (NO at Step A5), the beacon device 2 returns to Step A4 to disregard the beacon signal received this time. However, when it is from the pairing partner (YES at Step B5), the beacon device 2 judges the user communication device 1 as a connection target (Step A6).

When a connection between the user communication device 1 and the beacon device 2 is established as described above, the user communication device 1 drives the speaker of the audio signal processing section 14 to generate a notification sound and causes the touch display section 18 to light or flash a predetermined icon so as to notify that the connection to the beacon device 2 has been established (AR display has been started) (Step B11 of FIG. 10). In addition, the user communication device 1 transmits an LED control signal to the connected beacon device 2 as a notification signal for notifying the current state to the beacon device 2 (Step B12). Then, the user communication device 1 operates the imaging section 17 to consecutively acquire a live view image, and starts an operation of displaying the live view image on the monitor screen of the touch display section 18 (Step B13).

When the LED control signal is received from the user communication device 1 (YES at Step A6 in FIG. 9), the beacon device 2 drives the rendition LED display section 24 to emit rendition light by the lighting or flashing of various lights and thereby notifies that the AR display has started on the user communication device 1 side (Step A8). Next, the beacon device 2 judges whether the power has been turned off (Step A9). When the power is still on (NO at Step A9), the beacon device 2 judges whether the connection with the user communication device 1 has been maintained (Step A10). When the connection has been maintained (YES at Step A10) the beacon device 2 returns to Step A7. When the user communication device 1 is moved away from the beacon device 2 and the communication available area, the connection is canceled (NO at Step A10), and the beacon device 2 proceeds to Step A4 and repeats the above-described operations until the power is turned off.

When the above-described operation of displaying the live view image is started, the user communication device 1 proceeds to the flowchart of FIG. 11, analyzes the live view image, and judges whether the AR marker 2a is in the live view image (Step B14). More specifically, the user communication device 1 compares the AR marker 2a downloaded from the server device 3 with the AR marker 2a in the live view image so as to judge whether the AR marker 2a of the pairing partner is in the live view image. When the AR marker 2a is not in the live view image (NO at Step B14) the user communication device 1 proceeds to Step B29 described later. When the AR marker 2a is in the live view image (YES at Step B14), the user communication device 1 references the BEACON-SPECIFIC CHARACTER TABLE TB2 based on the AR marker 2a, reads out the corresponding beacon ID of the connected device, and transmits the beacon ID of the connected device and its user ID to the server device 3 so as to request the distribution of the character usage status corresponding to the beacon ID (Step B15).

When the request for the distribution of the character usage status is received from the user communication device 1 (Step C10 in FIG. 12), the server device 3 references the USER-SPECIFIC CHARACTER USAGE STATUS TABLE TB4 based on the beacon ID and the user ID received from the user communication device 1 with the request, reads out the "CLOSENESS ("ACCESS TIME CUMULATIVE TOTAL VALUE" and "ACCESS FREQUENCY)" and the "NUMBER OF ACCESSES" as the corresponding character usage status, and performs processing of distributing them to the user communication device 1 that is the source requesting the distribution (Step C11).

When the character usage status is received from the server device 3 (Step B16 in FIG. 11), the user communication device 1 proceeds to the next Step B17, references the CHARACTER MOTION CONTROL TABLE TB3 based on the character motion control information downloaded from the server device 3 and the current time band and location, and reads out the corresponding character data from the CHARACTER DATA FILE GROUP CF. More specifically, the user communication device 1 first compares a "TIME BAND" and a "LOCATION" that are condition items constituting an "appearance condition" of the character motion control information with timing information acquired by the timing function and position information (location) acquired by the GPS section 19, and judges whether the "APPEARANCE CONDITION" is satisfied. When judged that the "APPEARANCE CONDITION" is satisfied, the user communication device 1 judges whether the condition of the "APPEARANCE RATE" is satisfied, based on the "NUMBER OF ACCESSES (PER DAY)" of the character usage status.

Here, when all the three conditions are satisfied, the user communication device 1 reads out the corresponding character data. Namely, the user communication device 1 references the "CLOSENESS" and the "USAGE ENVIRONMENT" of the character motion control information, the character usage status (closeness), the timing information acquired by the timing function, and the position information (location) acquired by the GPS section 19, and reads out character data (3DCG figure image and audio) corresponding to the closeness and the usage environment from the CHARACTER DATA FILE GROUP CF. For example, the basic motion data is read out if the closeness is not high (low or normal), and variation data is read out if the closeness is high. Here, in a case where the user is at a specific place such as a beach, variation data of which the character has changed clothing is read out.

After reading out the character data corresponding to the closeness and the usage environment, the user communication device 1 identifies the position and the direction based on the AR marker included in the live view image (Step B18). Note that the coordinate system conversion for identifying the marker position and direction is a general technique, and therefore descriptions thereof are omitted herein. Then, after performing processing of changing the viewing angle of the character data (3DCG figure image) based on the identified direction of the marker (Step B19), the user communication device 1 displays the character data in this pose on the touch display section 18 by AR display, and starts its motion (Step B20). Here, the character display is performed at the position of the AR marker in the live view image or the vicinity thereof. Also, if the displayed character data includes voice sounds, a voice emitting operation is started. Then, the user communication device 1 starts a counting operation by a character display time timer (not shown) (Step B21).

Next, the user communication device 1 proceeds to Step B22, and performs correction processing of detecting an image portion showing the beacon device 2 in the live view image, recognizing and erasing this image portion as an unnecessary portion, and assimilating the erased portion into the background. Also, when displaying the character in the live view image, the user communication device 1 identifies a light source direction (brightest direction) based on the brightness distribution of the live view image (Step B23), inserts the shadow (human figure) of the character into the side opposite to the light source direction, and performs processing of correcting this portion (Step B24). During the AR display of the character, for example, when the basic motion is to be changed to a variation motion, an intermediate motion is inserted therebetween. Similarly, when a variation motion is to be changed to the basic motion, an intermediate motion is inserted therebetween. As such, by an intermediate motion being inserted before or after a variation movement, a series of motions can be smoothly performed.

During this AR display of the character, the user communication device 1 judges whether the live view image (touch screen) has been tapped by a user operation (Step B25), judges whether an imaging instruction operation (shutter operation) has been performed (Step B27), and judges whether an operation of canceling the AR display mode (mode switching operation) has been performed (Step B29). When no operation has been performed (NO at Step B29) the user communication device 1 returns to Step B22, enters an operation standby state, and repeats the same operations.

When the live view image (touch screen) is tapped by a user operation (YES at Step B25), the user communication device 1 starts interaction processing between the user and the character (Step B26). More specifically, the user communication device 1 references the CHARACTER MOTION CONTROL TABLE TB3 and changes the character motion to a variation corresponding to the motion control information "TAP REACTION" corresponding to the character being displayed. For example, when a tapping operation is performed during the display of the character eating a meal, processing is performed by which the character motion is changed to a variation where the character stops eating and gives a comment. Note that the interaction processing is not limited to the voice emission of the character. For example, processing may be performed by which the user and the character have a dialogue, or processing may be performed which corresponds to a touch jester operation such as a swipe operation and a pinch-in operation.

Also, when an imaging instruction operation (shutter operation) is performed (YES at Step B27), the user communication device 1 stops the operation of the AR display at the timing of the shutter operation, acquires an image of the live view including the stopped character, performs photographing processing so that the stopped character of the acquired image is composited to the position of the beacon device 2, and records and stores it in a recording medium of the storage section 22 as a captured image (Step B28). For example, if a shutter operation is performed when the character displayed in the live view image by AR display has jumped as shown in FIG. 2, a captured image including the character stopped at the timing of the jump is recorded and stored.

Also, when an operation (mode switching operation) of canceling the AR display mode is performed (YES at Step B29), the user communication device 1 cancels the AR display in the live view image, stops the counting operation by the character display time timer, transmits the own user ID, the ID of the character being displayed, the character-displayed time (time counted by the timer), and the current date and time to the server device 3 so as to request the server device 3 to update the character usage status (Step B30). Then, the user communication device 1 returns to the flowchart of FIG. 11, and proceeds to processing corresponding to another operation mode.

Then, in response to the update request of the character usage status from the user communication device 1 (Step C12 in FIG. 12), the server device 3 receives the user ID, the ID of the character being displayed, the character-displayed time, and the current date and time with the update request (Step C13). Subsequently, the server device 3 references the USER-SPECIFIC CHARACTER USAGE STATUS TABLE TB4 based on the user ID and the ID of the character being displayed, and performs processing of updating the "ACCESS TIME CUMULATIVE TOTAL VALUE", the "ACCESS FREQUENCY" and the "NUMBER OF ACCESSES" of the corresponding character usage status based on the character-displayed time (time counted by the timer) and the current data and time received from the user communication device 1 (Step C14). Here, the character-displayed time (time counted by the timer) is added to the "ACCESS TIME CUMULATIVE TOTAL VALUE" so as to update the "ACCESS TIME CUMULATIVE TOTAL VALUE", and "1" is added to the values of the "ACCESS FREQUENCY" and the "NUMBER OF ACCESSES" based on the current date and time so as to update these values. Then, the server device 3 returns to the first Step C1 and thereafter repeats the above-described operations.

As described above, in the object (character) display system of the present embodiment, each beacon device 2 is a mobile object where image information (AR marker) indicating the existing position of the own terminal device in real space has been provided on the surface of the device, and transmits a beacon signal including predetermined identification information (beacon ID). Also, each user communication device 1 is a mobile object having the imaging function, and identifies the position of the corresponding beacon device 2 by recognizing the AR marker thereof in a live view image generated based on results of image capturing by the imaging function. This user communication device 1 receives a beacon signal transmitted from the beacon device 2, transmits its beacon ID to the server device 3, and performs control such that a character corresponding to the beacon ID which has been transmitted from the server device 3 in response to the beacon ID transmission is displayed at the identified position of the beacon device 2 in the live view image. Also, the server device 3 references the CHARACTER DATA FILE GROUP CF and transmits to the user communication device 1 a character corresponding to a beacon ID transmitted from the user communication device 1. As a result of this configuration, the display of a character selected by each user can be controlled such that a sense of reality where the user feels as if the character exists in real space can be freely acquired anytime and anywhere, so that the user can gradually gain interest and affection by the use of the favorite character, and also relaxation effects can be expected. Furthermore, a character that has a different appearance and makes a different motion can be assigned for each user or each beacon device 2 that is a device which can be possessed and carried around by an individual, and the character can be displayed in a state (appearance, operation, place, time) based on the individual's preference and convenience.

Also, pairing by mutual communication is performed at the time of connection between the user communication device 1 and the beacon device 2. As a result of this configuration, when this beacon device 2 is a pairing partner, character display can be performed. In addition, even if a third person other than the user possessing the beacon device 2 photographs the beacon device 2, the character can be prevented from being displayed on the user communication device 1 of the third person.

Moreover, after the correspondence relationship of the user communication device 1 and the beacon device 2 is registered in the USER TABLE TB1 as a combination relationship of pairing partners, when a beacon signal including the beacon ID is received from the beacon device 2, the user communication device 1 can perform character display on condition that the beacon device 2 has been confirmed as a pairing partner based on the registered contents of the USER TABLE TB1. As a result of this configuration, pairing partners can be reliably managed.

Furthermore, the image information (AR marker) 2*a* provided on the surface of the beacon device 2 is information indicating the existing position and orientation of the own device in real space, and the character is a figure image generated in 3DCG. Therefore, the user communication device identifies the position and the orientation of the beacon device 2 in a live view image by recognizing the AR marker appearing in the live view image, and displays the figure image in the live view image in accordance with the position and the viewing angle. Accordingly, by the AR marker 2*a* being simply provided on the surface of the beacon device 2 that is a mobile object, the position and the viewing angle of the 3DCG figure image can be changed as intended by the user during AR display.

Still further, the image information (AR marker) 2*a* provided on the surface of the beacon device 2 is an image representing a characteristic portion (a person's face portion) of images constituting a figure image. Accordingly, by simply looking at the AR marker 2*a*, the user can be reminded of the figure image, which makes clear the correspondence relationship of the beacon device 2 and the figure image.

Yet still further, the character herein is a 3DCG figure image that makes a series of motions by combining various types of basic motions and variation motions. After basic motion data and motion control information indicating appearance conditions of the corresponding motion are stored in the CHARACTER DATA FILE GROUP CF for each basic motion of various types of figure images, when the user communication device 1 is to display a figure image in a live view image, the user communication device 1 references the motion control information of this figure image, selects basic motion data that matches appearance conditions, and performs control such that the basic motion data is sequentially displayed in the live view image. As a result of this configuration, a figure image acquired by, among a plurality of basic motions constituting the figure image, only a basic motion that matches appearance conditions being combined can be displayed by AR display.

Yet still further, the appearance conditions herein are "TIME BAND", "LOCATION" and "APPEARANCE RATE", and a basic motion that satisfies these three conditions is selected. As a result of this configuration, a figure image can be appropriately displayed by AR display.

Yet still further, the character herein is a 3DCG figure image that performs a series of motions by combining various types of basic motions and variation motions acquired by the basic motions being changed. After basic motion data, variation data, and motion control information indicating replacement conditions for making a variation motion instead of a basic motion are stored in the CHARACTER DATA FILE GROUP CF for each basic motion of various types of figure images, when the user communication device 1 is to sequentially select and display basic motion data constituting a figure image in a live view image, the user terminal device 1 references the motion control information of the figure image and, when replacement conditions are satisfied, selects variation data instead of the basic motion data at the time. As a result of this configuration, a figure image where a basic motion and a variation motion acquired by the basic motion being changed have been combined can be displayed by AR display. Accordingly, characters having unique characteristics which are different for each user can be grown by the interaction of each user and his or her character.

Yet still further, the replacement condition herein is a cumulative access time or an access frequency with respect to a figure image which serve as information representing closeness that changes in accordance with a relationship between the user and the figure image. Based on this closeness, the user communication device 1 selects variation data instead of basic motion data. As a result of this configuration, the motion of a figure image can be changed based on closeness.

Yet still further, the replacement condition herein is information (tap operation) indicating the type of a user operation, and the user communication device 1 selects variation data instead of basic motion data in response to a tap operation. As a result of this configuration, variation data can be selected by a user operation.

Yet still further, the replacement condition herein is a usage environment including "SEASON" and "LOCATION" when a figure image is displayed in a live view image. When an environment at the time of the AR display of a figure image corresponds to "SEASON" and "LOCATION" of the replacement condition, the user communication device 1 selects variation data instead of motion data. As a result of this configuration, variation data can be selected in accordance with a usage environment.

Yet still further, when connection with the beacon device 2 is detected as a predetermined state, the user communication device 1 transmits an LED control signal so as to instruct the beacon device 2 to drive the rendition LED display section 24. As a result of this configuration, the user can know that the current state is a state where AR display can be performed, via the beacon device 2.

Yet still further, when connection with the beacon device 2 is detected, the user communication device 1 drives the speaker or the vibration notification section 15 of the audio signal processing section 14 so as to notify that the connection has been established. As a result of this configuration, the user can know that the current state is a state where AR display can be performed, by notification. Namely, even when the user communication device 1 is in a bag or the user is under a noisy environment, this state can be known by vibration notification.

Yet still further, when an imaging instruction operation is performed while a figure image is being displayed in a live view image, the user communication device 1 stops the motion of the figure image in response to the imaging instruction, and records and stores a captured image where the stopped figure image has been composited to the position of the beacon device 2. As a result of this configuration, an instantaneous pose of a moving figure can be in a captured image having the user's favorite place as a background.

Yet still further, when performing the control of displaying a character in a live view image, the user communication device 1 performs processing of deleting a portion of the live view image showing the beacon device 2 and correcting the deleted portion. As a result of this configuration, an image excluding an unnecessary portion showing the beacon device 2 can be acquired, and the sense of reality of a character can be further increased.

Yet still further, when performing the control of displaying a character in a live view image, the user communication device 1 performs processing of identifying a light source direction based on the brightness distribution of the live view image and inserting the shadow of the character on the side opposite to the light source direction so as to correct the relevant portion. As a result of this configuration, the sense of reality of a character can be further increased.

First Modification Example

In the above-described embodiment, for each user, a user communication device 1 and a beacon device 2 are associated with each other in a one-to-one relationship as pairing partners. However, the present invention is not limited thereto and this combination may be arbitrary determined.

Figure 14A:
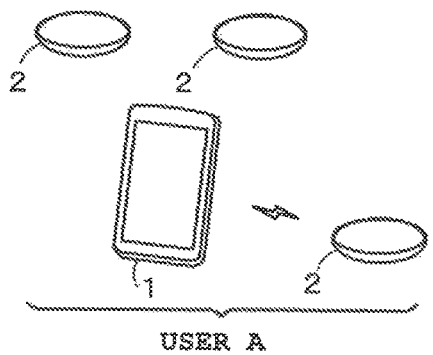
FIGS. 14A, 14B and 14C are diagrams describing modification examples of the embodiment, in which a relationship between the user communication device 1 and the beacon device 2 associated with each other as pairing partners is exemplarily shown.
Figure 14B:
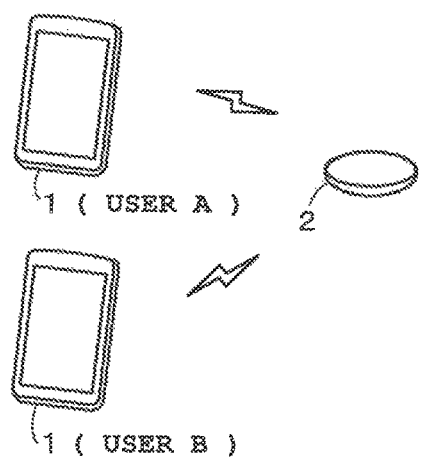
Figure 14C:
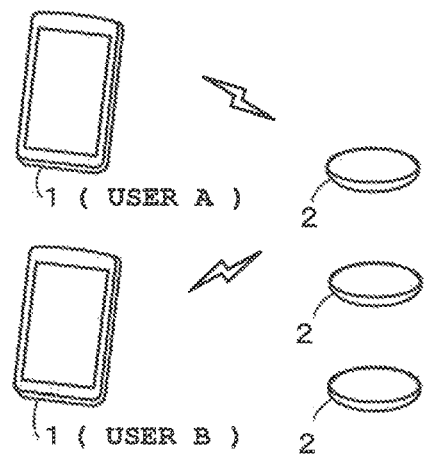

FIGS. 14A, 14B and 14C are diagrams describing a modification example of the embodiment, and shows a relationship between user communication devices 1 and beacon devices 2 associated with one another as pairing partners. FIG. 14A shows a case where a user communication device 1 and beacon devices 2 have been associated as pairing partners in a one-to-n (integer, the same applies hereafter) relationship. In the shown example, they have been associated in a one-to-three relationship. FIG. 14B shows a case where user communication devices 1 and a beacon device 2 have been associated as pairing partners in an n-to-one relationship. In the shown example, they have been associated in a two-to-one relationship. FIG. 14C shows a case where user communication devices 1 and beacon devices 2 have been associated as pairing partners in an n-to-n relationship. In the shown example, they have been associated in a two-to-three relationship.

In the cases where they are associated in a one-to-n relationship, an n-to-one relationship, or an n-to-n relationship as described above, a correspondence relationship between user communication devices 1 and beacon devices 2 is registered in the USER TABLE TB1 as a combination relationship of pairing partners. Note that n may be a fixed value set at the time of product shipment or a value arbitrarily set by a user operation. Also, a configuration may be adopted in which, when the association in a one-to-n relationship, an n-to-one relationship, or an n-to-n relationship is completed, namely, when the value of n is reached, the value of the above-described pairing set flag is set to "1" (flag ON) automatically or by a user operation.

By the above-described association in a one-to-n relationship, an n-to-one relationship, or an n-to-n relationship, a combination of user communication devices 1and beacon devices 2 can be arbitrarily set, such as when sisters or friends share the same character, when one user possess a plurality of beacon devices 2 to enjoy a plurality of characters, and the like. Also, in a case where a user communication device 1 and beacon devices 2 have been associated in a one-to-n relationship, when the same user purchases the same type of beacon device 2, the status of its character (initial status such as motion, conversation and clothing) does not change at the initial stage of the purchase. However, each character acquires its own characteristics based on closeness with the user, so that characters that are different for each beacon device 2 are made to grow.

In the above-described embodiment, when the same type of beacon devices 2 are purchased, the statuses of their characters (initial status such as motion, conversation and clothing) are not different at the initial stage of the purchase. However, a configuration may be adopted in which different characters (characters whose initial statuses are different) are assigned to the respective beacon devices 2 (beacon IDs). For example, a configuration may be adopted in which the same type of characters having different initial statuses regarding motion, conversation and clothing are assigned to beacon devices 2, whereby a plurality of users can purchase beacon devices 2 corresponding to the same character. In this case, different individuals (different management information) are assigned to the respective beacon devices 2 (beacon IDs).

In the above-described embodiment, a "USER ID" for one user terminal is stored and managed for each user, and transmitted or received. However, in order to allow the same user to use different user communication devices 1, a configuration may be adopted in which a plurality of "USER IDs" are stored and managed for each user to be identified, and transmitted or received. This "USER ID" may be information inputted by a user operating the user communication device 1.

In the above-described embodiment, a "BEACON ID" includes information indicating the type of a beacon device 2 (type of object) in addition to information identifying itself (beacon device 2). However, the terminal identification information and the type information may be separately stored and managed.

In the above-described embodiment, a "BEACON ID" and a "CHARACTER ID" are associated with each other in a one-to-one relationship. However, a configuration may be adopted in which a beacon device 2 and a character specialized for each user are associated with each other in a one-to-one relationship. This character specialized for each user refers to a character whose status has been (initial status such as motion, conversation and clothing) set to be different for each user at the initial stage of purchase.

In the above-described embodiment, a beacon device 2 and a character are fixed in a one-to-one relationship, and the character corresponding to the beacon terminal is assigned at the time of new introduction (time of purchase). However, the character may be assigned after the purchase. In this case, in a method for applying for a character, the user's favorite character is selected from a character list screen, and transmitted to the server device 3 to make the application.

Second Modification Example

In the above-described embodiment, the present invention has been applied in an object display system which includes a plurality of user communication devices 1, a plurality of beacon devices 2 and a server device 3, and displays an object on a user communication devices 1 by communication with the user communication device 1, the corresponding beacon device 2, and the server device 3. However, the server device 3 may be omitted. More specifically, the object display system may be configured such that an object is displayed on a user communication device 1 by communication between the user communication device 1 and the corresponding beacon device 2. This configuration can be actualized by the BEACON-SPECIFIC CHARACTER TABLE TB2, the CHARACTER MOTION CONTROL TABLE TB3, the USER-SPECIFIC CHARACTER USAGE STATUS TABLE TB4, and the CHARACTER DATA FILE GROUP CF being provided on the user communication device 1 side, and the processing related to data exchange between the user communication device 1 and the server device 3 in the flowcharts of FIG. 10 and FIG. 11 being deleted or corrected.

Namely, this object display system displays an object on a user communication device 1 by communication between the user communication device 1 and the corresponding beacon device 2. The beacon device 2, which is a communication device serving as a mobile object and on the surface of which image information (AR marker) indicating the existing position of the own terminal device in real space has been provided, transmits a beacon signal including predetermined identification information (beacon ID). The user communication device 1, which is a communication device serving as a mobile object and having an imaging function, acquires management information of an object (character) associated with each predetermined identification information, identifies the position of the corresponding beacon device 2 by recognizing its AR marker in a live view image generated based on results of image capturing by the imaging function, receives a beacon signal transmitted from the beacon device 2, and controls such that the character based on the management information is displayed at a position corresponding to the identified position of the beacon device 2 in the live view image.

By this object display system that displays an object on a user communication device 1 by communication between the user communication device 1 and the corresponding beacon device 2, an object can be displayed in a state that matches the user's preference and convenience, as with the above-described embodiment.

In this case, by each beacon device 2 and the corresponding user communication device 1 being communication devices possessed for each user, character display can be controlled so that a sense of reality where each user feels as if a character selected for each user exists in real space can be freely acquired anytime and anywhere. As a result, each user can gradually gain interest and affection by the use of the favorite character, and also relaxation effects can be expected.

In the above-described embodiment, each beacon device 2 transmits a beacon signal including its beacon ID for identifying itself as predetermined identification information. However, a configuration may be adopted in which the beacon ID and an object ID (such as a character ID) that servers as information for specifying an AR display target are included and transmitted. By this configuration where information (object ID) for specifying an AR display target is transmitted, the above-described BEACON-SPECIFIC CHARACTER TABLE TB2 becomes unnecessary.

In the above-described embodiment, the "TIME BAND", the "LOCATION" and the "APPEARANCE RATE" have been shown as the "APPEARANCE CONDITION". However the present invention is not limited thereto and the "USER ID" may serve as the "APPEARANCE CONDITION", whereby a configuration can achieved in which, for each basic motion, a character appears for a specific user and the appearance of the character is prohibited for other users.

In the above-described embodiment, the "ACCESS TIME CUMULATIVE TOTAL VALUE" and the "ACCESS FREQUENCY" have been shown as the "CLOSENESS". However the present invention is not limited thereto and "number of touches", "touch frequency" and the like with respect to a live view screen may serve as the "CLOSENESS".

In the above-described embodiment, each beacon device 2 notifies that AR display is started on the corresponding user communication device 1 side, by driving its rendition LED display section 24. However, a configuration may be adopted in which rendition light is generated during AR display, or rendition light is generated only during a specific motion such as strenuous exercise. Namely, the manner and timing of the rendition may be arbitrarily determined.

In the above-described embodiment, a still image added with a character is recorded and stored. However, a moving image added with a moving character may be recorded and stored.

In the above-described embodiment, each beacon device 2 has, in its entirety, a thin circular button shape that can be carried around. However, the shape may be arbitrarily determined, and may be a doll shape, a star shape and the like.

In the above-described embodiment, the beacon signal is a wireless signal that is emitted to notify another device that the own terminal device exists within a predetermined distance range. However, other than the configuration where this wireless signal is (periodically) emitted automatically, a configuration may be adopted in which the own terminal device transmits this wireless signal in response to a wireless signal (periodically) emitted from the other device.

In the above-described embodiment, the present invention has been applied in a smartphone as the user communication device 1. However, the present invention is not limited thereto and may be applied in a PDA (Personal Digital Assistance) having a camera function, a tablet terminal device, an electronic game machine, a music player and the like.

Also, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

The invention claimed is:
1. An object display system which comprises a user communication device, a beacon device and a server device, and displays an object on the user communication device by communication with the user communication device, the beacon device and the server device,
wherein the beacon device has image information provided on a surface thereof and comprises a transmission section which transmits a beacon signal including predetermined identification information,
wherein the user communication device comprises:
an imaging section;
a display section which displays a live view image that is based on results of image capturing by the imaging section;
a first communication section; and
a first processor which:
(i) recognizes the image information of the live view image captured by the imaging section and identifies a position of the beacon device in the live view image,
(ii) controls the first communication section to receive the beacon signal transmitted from the beacon device and controls the first communication section to transmit the predetermined information included in the beacon signal to the server device,
(iii) controls the first communication section to receive management information of the object corresponding to the identification information transmitted from the server device that received the predetermined identification information, and
(iv) controls the display section to display the object based on the received management information of the object, at the identified position in the live view image,
wherein the server device comprises:
an object storage section which stores management information of various types of objects in association with predetermined identification information;
a second communication section; and
a second processor which:
(i) controls the second communication section to receive the predetermined identification information transmitted from the user communication device by the first processor,
(ii) acquires, from the object storage section, the management information of the object corresponding to the received predetermined identification information, and
(iii) controls the second communication section to transmit the management information to the user communication device,
wherein the object is a figure image which is created by three-dimensional computer graphics and performs a series of motions by combining various types of basic motions and variation motions acquired by the basic motions being changed, and
wherein the first processor, when sequentially selecting and displaying basic motion data constituting the figure image in the live view image, references motion control information indicating a replacement condition for performing a variation motion instead of basic motion data for each basic motion and, when the replacement condition is satisfied, selects variation data stored in the object storage section instead of current basic motion data.

2. The object display system according to claim 1, wherein:
the predetermined identification information is associated with the user communication device in advance, and
the first processor controls display of the object based on whether the predetermined identification information received from the beacon device has been associated with the user communication device.

3. The object display system according to claim 1, wherein:
the first processor of the user communication device further controls the first communication section to transmit user identification information for identifying the user communication device or a user of the user communication device to the server device, and
the server device further comprises a user information storage section which stores the transmitted user identification information and the predetermined identification information in association with each other.

4. An object display system which displays an object on a user communication device by communication between the user communication device and a beacon device,
wherein the beacon device has image information provided on a surface thereof and comprises a transmission section which transmits a beacon signal including predetermined identification information,
wherein the user communication device comprises:
an imaging section;
a display section which displays a live view image that is based on results of image capturing by the imaging section;
an object storage section which stores management information of the object associated with the predetermined identification information;
a communication section; and
a first processor which:
(i) recognizes the image information of the live view image captured by the imaging section and identifies a position of the beacon device in the live view image,
(ii) controls the communication section to receive the beacon signal transmitted from the beacon device,
(iii) controls the communication section to receive the beacon signal from the beacon device and acquire the predetermined identification information included in the received beacon signal,
(iv) acquires the management information of the object corresponding to the acquired predetermined identification information from the object storage section, and
(v) controls the display section to display the object based on the management information at the identified position in the live view image,
wherein the object is a figure image which is created by three-dimensional computer graphics and performs a series of motions by combining various types of basic motions and variation motions acquired by the basic motions being changed, and
wherein the first processor, when sequentially selecting and displaying basic motion data constituting the figure image in the live view image, references motion control information indicating a replacement condition for performing a variation motion instead of basic motion data for each basic motion and, when the replacement condition is satisfied, selects variation data stored in the object storage section instead of current basic motion data.

5. The object display system according to claim 4, wherein:
the predetermined identification information is associated with the user communication device in advance, and
the first processor controls display of the object based on whether the predetermined identification information received from the beacon device has been associated with the user communication device.

6. The object display system according to claim 1, wherein pairing by mutual communication is performed at time of connection between the beacon device and the user communication device.

7. The object display system according to claim 6, wherein the user communication device further comprises:
a pairing memorization section which memorizes and manages the beacon device as a pairing partner,
wherein the first processor:
(i) judges whether the beacon device that has transmitted the beacon signal is the pairing partner with reference to the pairing memorization section, when the beacon signal including the predetermined identification information is received from the beacon device, and
(ii) controls to display the object corresponding to the predetermined identification information in the live view image when the beacon device is judged as the pairing partner.

8. The object display system according to claim 1, wherein the transmission section of the beacon device transmits at least information identifying the own beacon device or information identifying the object to be displayed on the user communication device, as the predetermined identification information.

9. The object display system according to claim 1, wherein:
the image information provided on the surface of the beacon device indicates a viewing angle of the object in addition to the position of the beacon device in the live view image,
the object is a figure image generated by three-dimensional computer graphics, and
the first processor:
(i) identifies the position of the own beacon device and the display direction of the object in the live view image by recognizing the image information shown in the live view image, and
(ii) controls to display the figure image in the live view image in accordance with the identified position and the display direction.

10. The object display system according to claim 9, wherein the image information provided on the surface of the beacon device further indicates a characteristic portion of images constituting the figure image.

11. The object display system according to claim 1, wherein:
the first processor, when displaying the figure image in the live view image, references the motion control information which further indicates appearance conditions of the various types of basic motions, selects, as the basic motion data, basic motion data that matches an appearance condition from among the various types of basic motions stored in the object storage section, and controls to sequentially display the basic motion data in the live view image, thereby sequentially selecting and displaying the basic motion data constituting the figure image in the live view image.

12. The object display system according to claim 11, wherein the appearance condition is at least one of a time band, a location and an appearance rate.

13. The object display system according to claim 1, wherein:
the replacement condition is at least one of a cumulative access time and an access frequency with respect to the figure image which are information representing closeness that changes based on a relation of the user and the figure image, and
the first processor selects the variation data instead of the basic motion data in accordance with the closeness.

14. The object display system according to claim 1, wherein:
the user communication device further comprises an operation section which accepts a user operation with the figure image being displayed in the live view image,
the replacement condition is information indicating a type of the user operation performed by the operation section, and
the first processor selects the variation data instead of the basic motion data in accordance with the type of the user operation.

15. The object display system according to claim 1, wherein:
the first processor acquires information regarding a current season and information regarding a location with the replacement condition as environment information regarding an environment when the figure image is displayed in the live view image,
the replacement condition is the environment information acquired by the first processor, and
the first processor selects the variation data instead of the basic motion data in accordance with the acquired environment information.

16. The object display system according to claim 1, wherein:
the beacon device further comprises a first notification section which gives a notification regarding a state of the user communication device, and
the user communication device in a predetermined state transmits a notification instructing the beacon device to drive the first notification section.

17. The object display system according to claim 1, wherein the beacon device further comprises a second notification section which, when connection with the beacon device is detected, gives a notification regarding the connection.

18. The object display system according to claim 1, wherein the imaging section of the user communication device stops a motion of the figure image in response to an imaging instruction when a imaging instruction operation is performed with the figure image being displayed in the live view image, and records and stores a captured image where the stopped figure image has been inserted at the position of the beacon device identified by the first processor.

19. The object display system according to claim 1, wherein the first processor controls to erase an image portion showing the beacon device in the live view image and correct the erased portion, when controlling to display the object in the live view image.

20. The object display system according to claim 1, wherein the first processor controls to identify a light source direction based on a brightness distribution of the live view image, insert a shadow of the object on an opposite side of the light source direction, and correct a corresponding portion, when controlling to display the object in the live view image.

21. A user communication device comprising:
   an imaging section;
   an object storage section which stores management information of an object associated with predetermined identification information;
   a communication section; and
   a first processor which:
   (i) controls the communication section to receive a beacon signal including the predetermined identification information from an external beacon device showing image information indicating a position thereof in a live view image,
   (ii) recognizes the image information of the live view image captured by the imaging section and identifies the position of the beacon device in the live view image, and
   (iii) controls to acquire, from the object storage section, management information of the object associated with the predetermined identification information in the received beacon signal, and display the object based on the management information at the identified position in the live view image,
   wherein the object is a figure image which is created by three-dimensional computer graphics and performs a series of motions by combining various types of basic motions and variation motions acquired by the basic motions being changed, and
   wherein the first processor, when sequentially selecting and displaying basic motion data constituting the figure image in the live view image, references motion control information indicating a replacement condition for performing a variation motion instead of basic motion data for each basic motion and, when the replacement condition is satisfied, selects variation data stored in the object storage section instead of current basic motion data.

22. An object display method for a user communication device comprising an imaging section, a memory which stores management information of an object associated with predetermined identification information and a communication section, the object display method comprising:
   processing for controlling the communication section to receive a beacon signal including the predetermined identification information from an external beacon device showing image information indicating a position thereof in a live view image;
   processing for recognizing the image information of the live view image captured by the imaging section and identifying the position of the beacon terminal device in the live view image by recognizing the image information in the live view image; and
   processing for controlling to acquire, from the memory, the management information of the object corresponding to the predetermined identification information in the received beacon signal, and display the object based on the management information at the identified position in the live view image,
   wherein the object is a figure image which is created by three-dimensional computer graphics and performs a series of motions by combining various types of basic motions and variation motions acquired by the basic motions being changed, and
   wherein object display method further comprises:
   processing for, when sequentially selecting and displaying basic motion data constituting the figure image in the live view image, referencing motion control information indicating a replacement condition for performing a variation motion instead of basic motion data for each basic motion and, when the replacement condition is satisfied, selecting variation data stored in the memory instead of current basic motion data.

23. A non-transitory computer-readable storage medium having a program stored thereon for causing a computer of a user communication device comprising an imaging section, a memory which stores management information of an object associated with predetermined identification information, and a communication section, the program being executable by the computer to cause the computer to perform functions comprising:
   a beacon signal reception function of controlling the communication section to receive a beacon signal including the predetermined identification information from an external beacon device showing image information indicating a position thereof in a live view image;
   a recognition function of recognizing the image information of the live view image captured by the imaging section;
   an identification function of identifying the position of the beacon device in the live view image by recognizing the image information in the live view image that is based on results of image capturing by the imaging section; and
   a display control function of controlling to acquire, from the memory, the management information of the object corresponding to the predetermined identification information in the beacon signal received by the beacon signal reception function, and displaying the object based on the management information at the identified position in the live view image,
   wherein the object is a figure image which is created by three-dimensional computer graphics and performs a series of motions by combining various types of basic motions and variation motions acquired by the basic motions being changed, and
   wherein the display control function comprises, when sequentially selecting and displaying basic motion data constituting the figure image in the live view image, referencing motion control information indicating a replacement condition for performing a variation motion instead of basic motion data for each basic motion and, when the replacement condition is satisfied, selecting variation data stored in the memory instead of current basic motion data.

* * * * *